(12) United States Patent
Suzuki

(10) Patent No.: US 12,277,756 B2
(45) Date of Patent: Apr. 15, 2025

(54) COMPUTER-READABLE RECORDING MEDIUM, INFORMATION PROCESSING METHOD, AND INFORMATION PROCESSING APPARATUS

(71) Applicant: FUJITSU LIMITED, Kawasaki (JP)

(72) Inventor: Genta Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 17/730,704

(22) Filed: Apr. 27, 2022

(65) Prior Publication Data
US 2023/0032894 A1    Feb. 2, 2023

(30) Foreign Application Priority Data
Jul. 30, 2021   (JP) .................. 2021-125673

(51) Int. Cl.
*G06V 10/82*   (2022.01)
*G06N 3/08*    (2023.01)

(52) U.S. Cl.
CPC .............. *G06V 10/82* (2022.01); *G06N 3/08* (2013.01)

(58) Field of Classification Search
CPC .... G06V 10/82; G06V 40/28; G06V 2201/10; G06V 10/764; G06V 20/52; G06N 3/08
See application file for complete search history.

(56) References Cited

U.S. PATENT DOCUMENTS

| 2016/0210829 A1 | 7/2016 | Uchida et al. |
| 2017/0046707 A1 | 2/2017 | Krause et al. |
| 2019/0172039 A1 | 6/2019 | Kambara et al. |
| 2019/0327451 A1 | 10/2019 | Takeno |
| 2020/0118401 A1* | 4/2020 | Zalewski ............. G06Q 20/327 |
| 2020/0334470 A1 | 10/2020 | Abeykoon et al. |
| 2020/0364997 A1* | 11/2020 | Okamoto ............ G06V 40/172 |

(Continued)

FOREIGN PATENT DOCUMENTS

| JP | 2010-097458 A | 4/2010 |
| JP | WO2015/033576 A1 | 3/2017 |

(Continued)

OTHER PUBLICATIONS

Office Action dated Nov. 22, 2023, issued in counterpart EP application No. 22 184 119.0. (6 pages).

(Continued)

*Primary Examiner* — Ping Y Hsieh
*Assistant Examiner* — Vaisali Rao Koppolu
(74) *Attorney, Agent, or Firm* — WHDA, LLP

(57) ABSTRACT

An information processing program causes a computer to execute a process including: generating, by inputting a captured image into a machine learning model, skeleton information on a person included in the captured image; detecting, by using the skeleton information, a specific motion of the person related to an object included in the captured image; specifying, by using positional information on the person included in the captured image, a first area in which the person is located at a time of detection of the specific motion from among a plurality of areas; specifying, by reading setting information recorded in a memory, first setting information that is associated with the first area; and identifying, based on the first setting information, a priority level of a notification of an alert related to the specific motion of the person related to the object.

19 Claims, 20 Drawing Sheets

(56) References Cited

U.S. PATENT DOCUMENTS

| | | | | |
|---|---|---|---|---|
| 2022/0198550 A1* | 6/2022 | Meidar | ................. | G06Q 20/20 |
| 2022/0270455 A1* | 8/2022 | Uchida | ............ | G08B 13/19608 |
| 2022/0405774 A1* | 12/2022 | Paolella | ............ | G06Q 30/0201 |
| 2022/0414569 A1* | 12/2022 | Tomita | ................... | G06Q 30/06 |

FOREIGN PATENT DOCUMENTS

| | | | |
|---|---|---|---|
| JP | 2019-193089 A | | 10/2019 |
| JP | 2022185837 A | * | 12/2022 |
| WO | 2021/039314 A1 | | 3/2021 |

OTHER PUBLICATIONS

Office Action dated Apr. 4, 2023, issued in counterpart JP application No. 2021-125673, with English translation. (7 pages).

The Extended European Search Report dated Nov. 30, 2022, issued in counterpart EP application No. 22184119.0. (12 pages).

Koohzadi et al., "Survey on Deep Learning Methods in Human Action Recognition", IET Computer Vision, The Institution of Engineering and Technology, Dec. 1, 2017, vol. 11, Iss. 8, pp. 623-632, XP006064362, doi: 10.1049/iet-cvi.2016.0355; Cited in Extended European Search Report dated Nov. 30, 2022. (10 pages).

* cited by examiner

FIG.6

| AREA | AREA COORDINATES | AREA SECTION | WEIGHT W1 |
|---|---|---|---|
| A | {(400, 100), (560, 250), (560, 320), (400, 170)} | HIGH-PRICED & SMALL-SIZED COMMODITY PRODUCT | 1.0 |
| B | {(400, 175), (560, 325), (560, 395), (400, 260)} | LOW-PRICED & SMALL-SIZED COMMODITY PRODUCT | 0.3 |
| C | {(400, 265), (560, 315), (560, 415), (400, 365)} | LARGE-SIZED COMMODITY PRODUCT | 0.5 |
| ... | ... | ... | ... |

FIG.7

| AGE GROUP | GENDER | WEIGHT W2 |
|---|---|---|
| 0-9 | - | 0.3 |
| 10-19 | MALE | 1.0 |
| 10-19 | FEMALE | 0.8 |
| 20-29 | MALE | 0.7 |
| ... | ... | ... |
| 70 OR OVER | - | 0.4 |

FIG.13

| AREA | AREA COORDINATES | SHELF SECTION | SPEED X OF MOTION OF TAKING OUT COMMODITY PRODUCT FROM SHELF | SPEED Y OF MOTION OF PUTTING COMMODITY PRODUCT INTO BASKET | TIME T NEEDED TO REGISTER COMMODITY PRODUCT |
|---|---|---|---|---|---|
| A | {(400, 100), (560, 250), (560, 320), (400, 170)} | HIGH-PRICED & SMALL-SIZED COMMODITY PRODUCT | 1.0 | 0.6 | 5 |
| B | {(400, 175), (560, 325), (560, 395), (400, 260)} | LOW-PRICED & SMALL-SIZED COMMODITY PRODUCT | 1.0 | 0.6 | 10 |
| C | {(400, 265), (560, 315), (560, 415), (400, 365)} | LARGE-SIZED COMMODITY PRODUCT | 0.5 | 0.3 | 15 |
| ⋮ | ⋮ | ⋮ | ⋮ | ⋮ | ⋮ |

COMPUTER-READABLE RECORDING MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2021-125673, filed on Jul. 30, 2021, the entire contents of which are incorporated herein by reference.

FIELD

The embodiment discussed herein is related to an information processing program, an information processing method, and an information processing apparatus.

BACKGROUND

In retail stores, in order to prevent cash registers from being crowded, introduction of a system in which customers scan and register commodity products and perform checkout themselves is being facilitated. Furthermore, in recent years, introduction of a system in which customers scan commodity products at a place other than cash registers, for example, at a place of a sales floor where each of the commodity products is picked up by the customers by using an application installed in a terminal lent inside stores of the retail stores has been started. In such a system for customers to scan commodity products themselves, it is preferred to detect a scan omission of a commodity product in order to detect a fraudulent behavior, such as shoplifting.

In contrast, as a system for detecting a fraudulent behavior of a customer at retail stores, a system for detecting a suspicious behavior or a fraudulent behavior, such as shoplifting, of a customer by using, for example, a monitoring camera placed in a store has been developed.

Patent Literature 1: Japanese Laid-open Patent Publication No. 2019-193089
Patent Literature 2: U.S. Patent Application Publication No. 2017/0046707

SUMMARY

According to an aspect of an embodiment, a non-transitory computer-readable recording medium stores therein an information processing program. The information processing program causes a computer to execute a process including: generating, by inputting a captured image into a machine learning model, skeleton information on a person included in the captured image; detecting, by using the skeleton information, a specific motion of the person related to an object included in the captured image; specifying, by using positional information on the person included in the captured image, a first area in which the person is located at a time of detection of the specific motion from among a plurality of areas; specifying, by reading setting information recorded in a memory, first setting information that is associated with the first area; and identifying, based on the first setting information, a priority level of a notification of an alert related to the specific motion of the person related to the object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in area information 33 according to the first embodiment;
FIG. 7 is a diagram illustrating an example of data stored in person attribute information 34 according to the first embodiment;
FIG. 13 is a diagram illustrating an example of a parameter change according to the first embodiment.

DESCRIPTION OF EMBODIMENTS

However, on each of the sales floors, various commodity products with different types, sizes, unit prices are accommodated on shelves or the like. In particular, although the degree of importance of commodity products vary in accordance with a unit price of each of the commodity products, a degree of attention of sales areas of commodity products in the system for detecting a fraudulent behavior also varies in accordance with the degree of importance of the commodity products that are disposed. As a result, if a fraudulent behavior is simply and uniformly detected and an alert is simply and uniformly notified with respect to any commodity product regardless of the degree of importance of the commodity products or the degree of attention of the sales areas, a delay of a response to a commodity product with a high degree of importance may sometimes occur, or, in some cases, a case in which it is not possible to respond may possibly occur.

Preferred embodiments of the present invention will be explained with reference to accompanying drawings. Furthermore, the present embodiment is not limited by the embodiments. In addition, each of the embodiments can be used in any appropriate combination as long as processes do not conflict with each other.

[a] First Embodiment

Figure 1:
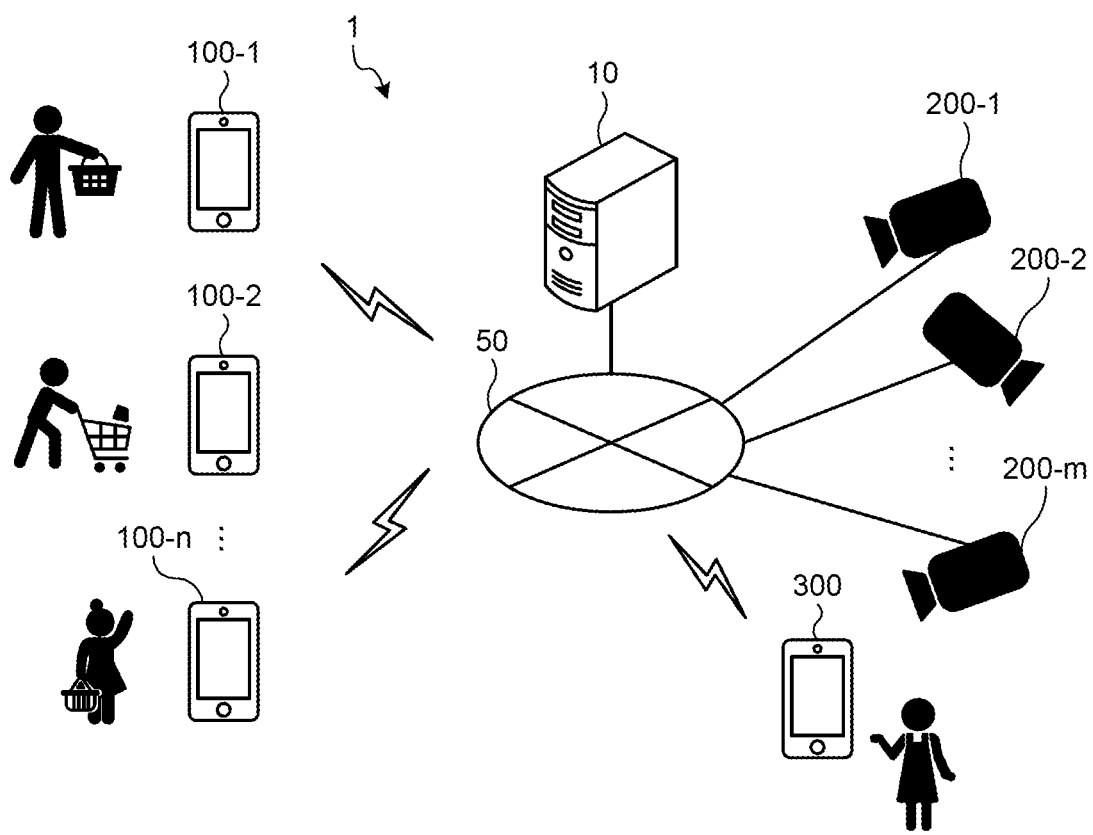
FIG. 1 is a diagram illustrating a configuration example of a fraud detection system according to a first embodiment.

First, a fraud detection system for implementing the present embodiment will be described. FIG. 1 is a diagram illustrating a configuration example of the fraud detection system according to the first embodiment. As illustrated in FIG. 1, a fraud detection system 1 is a system in which a fraud detection device 10, and user terminals 100-1 to 100-$n$ ($n$ is any integer. Hereinafter, collectively referred to as a "user terminal 100") are connected via a network 50 so as to be communicated with each other.

Furthermore, the fraud detection device 10 is also connected to camera devices 200-1 to 200-$m$ ($m$ is any integer. Hereinafter, collectively referred to as a "camera device 200") and a store clerk terminal 300 via the network 50 so as to be communicated with each other.

Various kinds of communication network, such as an intranet, that is used inside, for example, a store of a retail store may be used for the network 50 irrespective of a wired or wireless manner. Furthermore, instead of a single network, the network 50 may be constituted by way of, for example, a network device in which an intranet and the Internet are gateways or by way of another device (not illustrated). Furthermore, the inside of the store of the retail store is not limited to indoors, outdoors within the site of the retail store may be included The fraud detection device 10 is an information processing apparatus, such as a desktop personal computer (PC), a notebook PC, or a server computer, that is installed, for example, inside the store of the retail store and that is used by store staff, an administrator, or the like.

The fraud detection device 10 receives, from the camera device 200, a plurality of images obtained by capturing, by the camera device 200, a predetermined image capturing range, such as the inside of the store or the site of the retail store. Furthermore, the plurality of images mentioned here are, in a precise sense, video images captured by the camera device 200, that is, a series of frames of a moving image.

Furthermore, the fraud detection device 10 specifies, by using an existing object detecting technique, from a captured image, a customer who is visiting the store (herein after, sometimes referred to as a "person"), a shopping basket carried by the person (herein after, sometimes referred to as a "basket"), or the user terminal 100. Furthermore, by using an existing skeleton detection technique, the fraud detection device 10 generates, from the captured image, skeleton information on the specified person, estimates a pose of the person, and specifies a motion of putting a commodity product into the basket or a motion of registering a commodity product into the user terminal 100.

Furthermore, the fraud detection device 10 evaluates a behavior of each of the customers exhibited with respect to a commodity product. More specifically, for example, even though the fraud detection device 10 has specified a motion of each of the customers putting a commodity product into the basket, if a motion of registering the commodity product into the user terminal 100 is not specified, the fraud detection device 10 determines that a scan omission of the commodity product occurs. Then, if the fraud detection device 10 detects a fraudulent behavior of a customer, such as a scan omission of a commodity product, the fraud detection device 10 notifies the store clerk terminal 300 of an alert.

Furthermore, FIG. 1 illustrates the fraud detection device 10 as a single computer; however, the fraud detection device 10 may be a distributed computing system constituted by a plurality of computers. Furthermore, the fraud detection device 10 may be a cloud computer device managed by a service provider that provides a cloud computing service.

The user terminal 100 is an information processing terminal that is used by each of the customers to scan a barcode of a commodity product by themselves in order to purchase the commodity product and register the purchased commodity product. The user terminal 100 may be a mobile terminal, such as a smartphone or a tablet personal computer (PC), owned by the customer, or a dedicated terminal that is lent inside the store. The user terminal 100 has, installed therein in advance, an application for, for example, scanning and registering commodity products.

The camera device 200 is a monitoring camera installed, for example, inside the store or the site of the retail store. Furthermore, FIG. 1 illustrates a plurality of the camera devices 200; however, for example, the number of the camera devices 200 may be one in a case of a small store or the like. A video image captured by the camera device 200 is transmitted to the fraud detection device 10.

The store clerk terminal 300 may be a mobile terminal, such as a smartphone or a tablet PC, carried by a store clerk of the retail store, or may be an information processing apparatus, such as a desktop PC or a notebook PC, installed at a predetermined position inside the store. The store clerk terminal 300 receives an alert from the fraud detection device 10 in the case where a fraudulent behavior, such as a scan omission of a commodity product, of a customer is detected by the fraud detection device 10. Furthermore, a plurality of number of the store clerk terminals 300 may be present for, for example, the respective store clerks of the store, but the terminal that receives a notification of that alert may be limited to the terminal that is carried by, for example, a store clerk responsible for security positioned in the vicinity of an exit.

Figure 2:
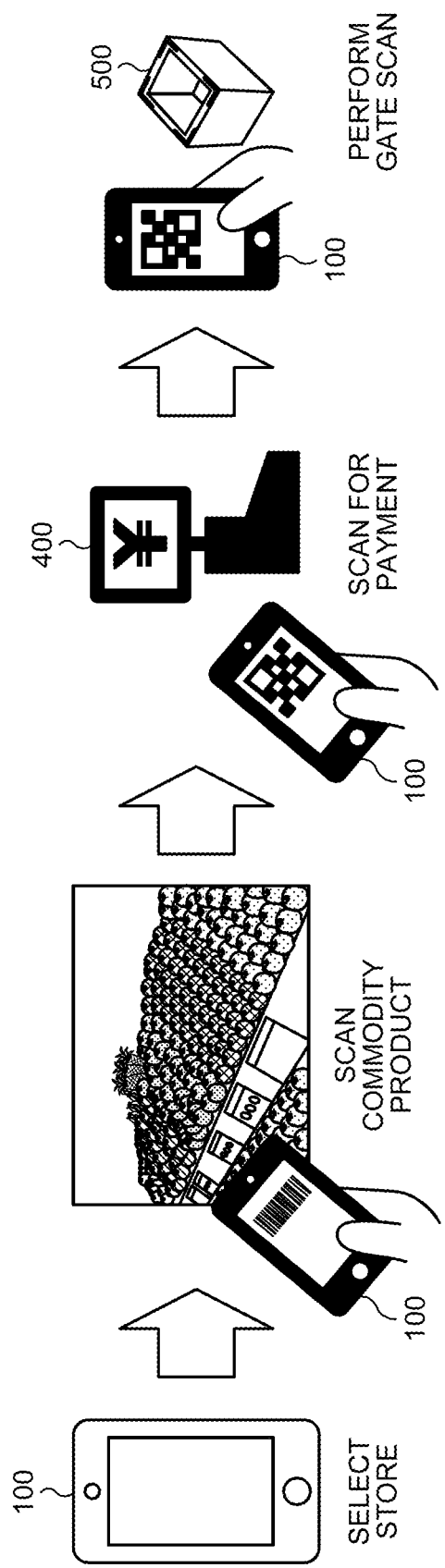
FIG. 2 is a diagram illustrating an example of a purchase of commodity products made by performing self-scanning according to the first embodiment.

In the following, a method in which a customer purchases commodity products by scanning and registering (hereinafter, sometimes referred to as "self-scanning") commodity products by himself or herself will be described with reference to FIG. 2 and FIG. 3. FIG. 2 is a diagram illustrating an example of a purchase of commodity products made by performing self-scanning according to the first embodiment.

As illustrated in FIG. 2, first, a customer selects a visited store through an application displayed on the user terminal 100. Then, the customer picks up commodity products to be purchased and reads, for example, a barcode of each of the commodity products, a barcode attached to a commodity product shelf for each of the commodity products, or the like by using the user terminal 100 (hereinafter, sometimes referred to as "commodity product scan"). As a result, the commodity products to be purchased are registered in the application.

Then, the customer scans a payment code displayed on a display unit of, for example, a self cash register terminal 400. Then, by making payment of an amount displayed on a payment screen of the self cash register terminal 400, the purchase of the commodity products has been completed. Furthermore, the customer is able to exit the store by causing a gate reader 500 or the like installed at the exit of the store or the like to read a payment completion code displayed on the user terminal 100. Furthermore, although not illustrated in FIG. 1, the self cash register terminal 400 and the gate reader 500 are connected to the fraud detection device 10 via the network 50 so as to be able to communicate with each other.

In the following, another example of a purchase of commodity products made by performing self-scanning will be described. FIG. 3 is a diagram illustrating another example of a purchase commodity products made by performing self-scanning according to the first embodiment.

Figure 3:
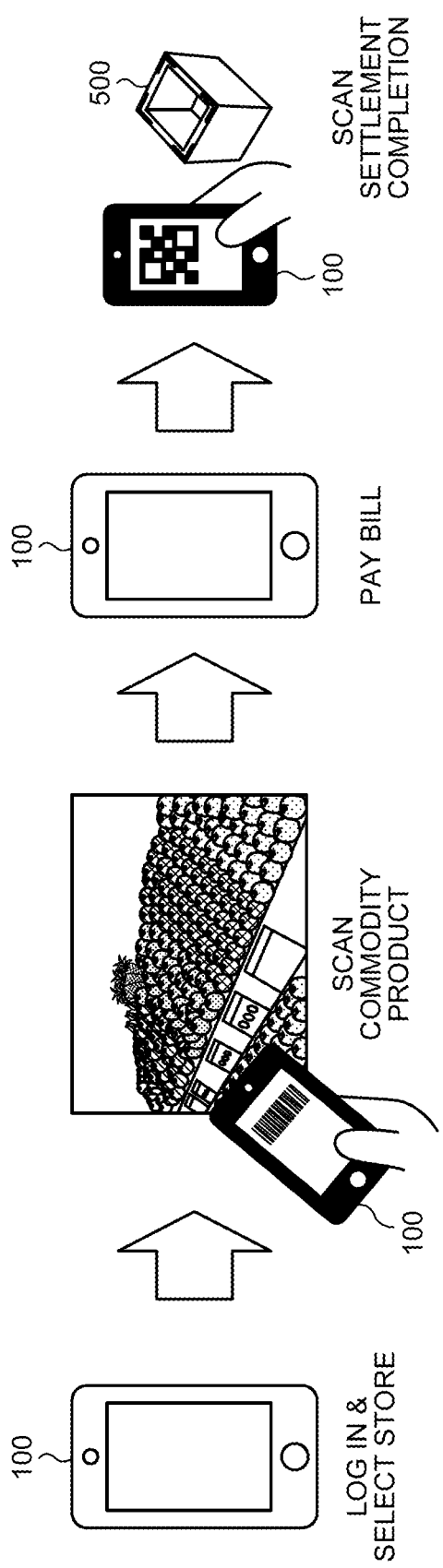
FIG. 3 is a diagram illustrating another example of the purchase of commodity products made by performing self-scanning according to the first embodiment.

As illustrated in FIG. 3, first, a customer logs in the application displayed on the user terminal 100 and selects the visited store. Then, the customer picks up commodity products to be purchased and reads, for example, a barcode of the commodity products to be purchased, a barcode attached to a commodity product shelf for each of the commodity products or the like by using the user terminal 100.

Then, the customer places a basket containing the commodity products to be purchased at a check point inside the store, and pays a bill of the commodity products to be purchased by pressing an "payment button", a "purchase button", or the like displayed on the user terminal 100. Furthermore, the payment of the commodity products to be purchased is able to be performed by using electronic money, a credit card, or the like through the application displayed on the user terminal 100. Then, the customer is able to exit the store by causing the gate reader 500 or the like installed at the exit of the store or the like to read a settlement completion code displayed on the user terminal 100.

In the above, a purchase of commodity products made by performing self-scanning has been described with reference to FIG. 2 and FIG. 3. However, in self-scanning, for example, a customer is able to put commodity products into a basket without performing a commodity product scan, and is able to avoid a payment without passing through a self cash register. Alternatively, a customer is able to avoid a payment of some of commodity products by scanning only some of the commodity products to be purchased and paying the bill of only the scanned commodity products at the self cash register. In particular, a fraudulent behavior tends to be easily found by a store clerk or the like in the case where the number of items of the commodity products is small; however, for example, it is difficult to find a fraudulent behavior by a store clerk or the like in the case where the number of items of the commodity products is large and some of the commodity products are not scanned.

Furthermore, in the case where a scan omission of a commodity product is detected by the fraud detection device 10, a motion of the commodity product scan varies in accordance with the type, the size, or the like of a commodity product, so that there may be a case in which correct detection is not sometimes performed. Furthermore, in the case where a scan omission of a commodity product is detected, the following problem may further occur. For example, not all customers perform a commodity product scan by using the user terminal 100. That is, in some cases, some customers collectively pay a bill at a self cash register terminal as in the past or some customers pay a bill assisted by a store clerk using a cash register. In other words, a person who has not performed commodity product scan is not always a person who exhibits a fraudulent behavior. Accordingly, for example, just detecting a person who has not performed a commodity product scan from a video image captured by the camera device 200 will result in detection of a customer who makes a payment at an ordinary cash register, so that it is difficult to accurately specify a person who exhibits a fraudulent behavior.

Figure 4:
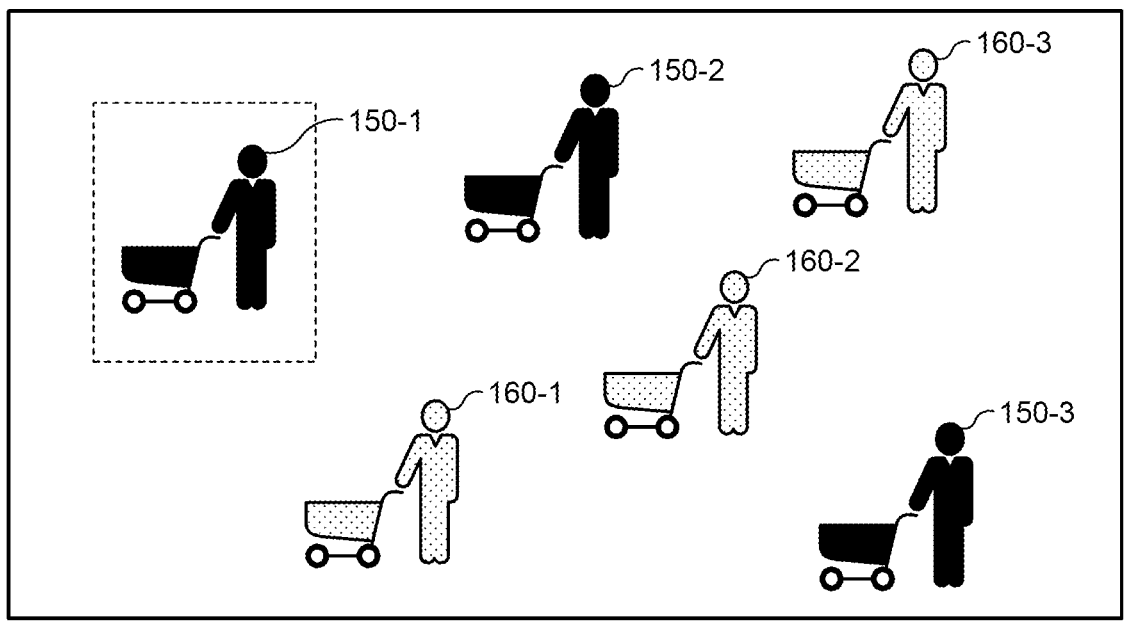
FIG. 4 is a diagram illustrating an example of fraud detection from a captured image according to the first embodiment.

FIG. 4 is a diagram illustrating an example of fraud detection from a captured image according to the first embodiment. FIG. 4 is an example of an image of the inside of the store captured by the camera device 200. As illustrated in FIG. 4, target persons for self-scanning 150-1 to 150-3 who make a purchase of commodity products by performing self-scanning using their user terminals 100 and target persons for normal cash register 160-1 to 160-3 who make conventional purchase of commodity products without performing self-scanning may be present inside the store.

For example, in the example illustrated in FIG. 4, it is assumed that only the target person for self-scanning 150-1 is a target person for a scan omission who has not intentionally performed self-scanning. Therefore, as illustrated in FIG. 4, detecting only the target person for self-scanning 150-1 as a target person for a scan omission is the correct answer for the fraud detection.

However, in the case where the fraud detection device 10 determines that a person who does not made the motion of registering a commodity product to the user terminal 100 is a target person for a scan omission, the fraud detection device 10 simply and erroneously detects the target person for normal cash register 160-1 to 160-3 who do not need to make this motion in the first place as target persons for the scan omission.

Furthermore, in the case where a person who has not performed a commodity product scan is detected from a video image obtained by the camera device 200, an amount of information transmitted to the fraud detection device 10 or an amount of information to be processed is increased, so that a problem that the processing load will be increased may possibly occur. Thus, one of objects of the present embodiment is to solve this problem and to decide a priority level of an alert notification when a fraud is detected at the time of purchase of commodity products made by performing self-scanning.

Functional Configuration of Fraud Detection Device 10

Figure 5:
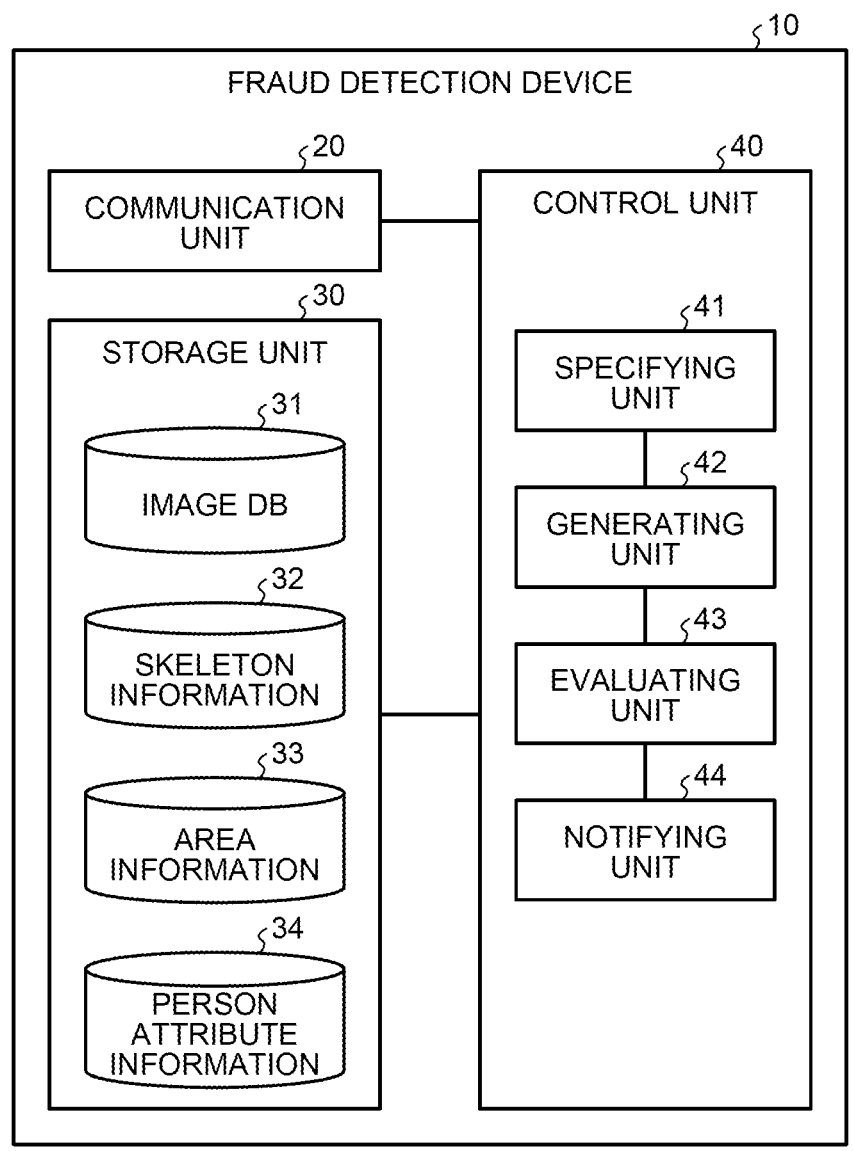
FIG. 5 is a configuration example of a fraud detection device 10 according to the first embodiment.

In the following, a functional configuration of the fraud detection device 10 will be described. FIG. 5 is a diagram illustrating a configuration example of the fraud detection device 10 according to the first embodiment. As illustrated in FIG. 5, the fraud detection device 10 includes a communication unit 20, a storage unit 30, and a control unit 40.

The communication unit 20 is a processing unit that controls communication with another device, such as the user terminal 100 or the camera device 200, and is, for example, a communication interface, such as a universal serial bus (USB) interface or a network interface card.

The storage unit 30 has a function for storing various kinds of data and a program executed by the control unit 40 and is implemented by, for example, a storage device, such as a memory or a hard disk. The storage unit 30 stores therein an image DB 31, a skeleton information 32, the area information 33, the person attribute information 34, and the like.

The image DB 31 stores therein a plurality of captured images that are a series of frames captured by the camera device 200. Furthermore, the image DB 31 is able to store therein positional information on a person or an object that is included in an image and that is specified with respect to the subject captured image.

The skeleton information 32 stores therein skeleton information on the person specified from the captured image that is captured by the camera device 200. A process of generating the skeleton information will be described later.

The area information 33 stores therein information related to a sales area (hereinafter, sometimes simply referred to as an "area") of commodity products, such as a sales floor or a shelf of the commodity product. FIG. 6 is a diagram illustrating an example of data stored in the area information 33 according to the first embodiment. As illustrated in FIG. 6, the area information 33 stores therein, in an associated manner, an "area" that is an identifier for uniquely identifying an area, "area coordinates" that indicates positional information on the area, an "area section" that indicates a section of the area, a "weight W1" that indicates a weight that is assigned for each area at the time of evaluating a motion, and the like.

Here, the sales area may be a large area in units of sales floors, or may be a small area, such as a single piece of shelf out of commodity product shelves. Furthermore, in the "area coordinates", for example, as illustrated in FIG. 6, positional information on pixels in the captured image captured by the camera device 200 may be set. In the example illustrated in FIG. 6, each of the area may be within the range indicated by a square that is formed by connecting four points indicated by the "area coordinates". Furthermore, in the "area section", the type or the size of a commodity product sold in an area, a character string indicating a price range, or a numerical value may be set. Furthermore, in the item of "weight W1", for example, a high value can be set to the sales area of high-priced commodity products. As will be described in detail later, with this setting, for example, it is possible to more easily detect a fraudulent behavior by more strictly defining an evaluation criterion or an alert notification criterion in the area in which a high value is set than the area in which a low vale is set in the item of "weight W1".

The person attribute information 34 stores therein information related to the weight for each person at the time of evaluating a motion. FIG. 7 is a diagram illustrating an example of data stored in the person attribute information 34 according to the first embodiment. As illustrated in FIG. 7, the person attribute information 34 stores therein, in an associated manner, an "age group" that indicates an age group of persons, a "gender" that indicates a gender of a person, a "weight W2" that indicates a weight for each person at the time of evaluating a motion, and the like. Here, in the "gender", a character string indicating a gender or a numerical value may be set, and, in the case where a male or a female may be set, null data, "-", or the like may be set. Furthermore, in the "weight W2", for example, it is possible to set a high value to a male in his teens who is highly likely to exhibit a fraudulent behavior. As will be described in detail later, with this setting, for example, it is possible to more easily detect a fraudulent behavior by more strictly defining an evaluation criterion or an alert notification criterion to the person to whom a high value is set than the person to whom a low value is set to the "weight W2".

Furthermore, the above described information stored in the storage unit 30 is only an example, and the storage unit 30 is able to store various kinds of information other than the information described above.

The control unit 40 is a processing unit that manages the entirety of the fraud detection device 10 and is, for example, a processor. The control unit 40 includes a specifying unit 41, a generating unit 42, an evaluating unit 43, and a notifying unit 44. Moreover, each of the processing units is an example of an electronic circuit included by the processor or an example of a process executed by the processor.

The specifying unit 41 specifies, from the captured image captured by the camera device 200, a person visiting a store and an object that is being used by the subject person. Examples of the object includes not only a basket, a commodity product, and the user terminal 100, but also a sales area in which the person visits, such as a sales floor or a shelf of the commodity product. Moreover, a process of specifying the person may include a process of tracking, from captured images that are captured at different time, the same person at the different time on the basis of the appearance and an amount of movement of the person. Furthermore, a process of specifying an area in which the person is visiting may include a process of specifying a sales area in which a target person is visiting by using the positional information between the person included in the captured image and the sales floor or the shelf of the commodity product.

Furthermore, the specifying unit 41 specifies setting information associated with the specified area. The setting information may be, for example, an "area section" of the area information 33 or the like.

Furthermore, the specifying unit 41 detects and specifies, on the basis of the specified object and the skeleton information generated by the generating unit 42, a motion of a person taking out a commodity product from a shelf in which the commodity product is accommodated. Furthermore, the specifying unit 41 detects and specifies a motion of the person putting the taken out commodity product into the basket and a motion of the person registering the commodity product targeted for the purchase into the user terminal 100. Moreover, by specifying the user terminal 100 carried by the person, the specifying unit 41 may limit a process of specifying each of the motions to the target persons for self-scanning who carries the user terminal 100.

Here, the process of specifying a motion of taking out the commodity product may include a process of specifying a motion of taking out a commodity product in the case where, for example, after the hand of the person enters a region of a commodity product shelf or the like, the person adopts a pose of standing up, squatting down, or bending down and extends the arm including the subject hand forward, and the hand is moving at a speed greater than or equal to a predetermined speed.

Furthermore, a process of specifying a motion of putting the commodity product into a basket may include a process of specifying, on the basis of the specified object and the skeleton information, a motion of putting a commodity product into a basket in the case where, for example, the hand of the person comes out from the region of the specified basket after the hand enters the region while moving at a speed larger than or equal to a predetermined speed.

Furthermore, a process of specifying a motion of registering the commodity product targeted for purchase may include a process of specifying, on the basis of the specified object and the skeleton information, a commodity product registration motion in the case where the hand of the person enters within a predetermined range of the region of the specified basket on the image, and the arm including the subject hand extends forward and does not move in a predetermined period of time. Furthermore, in another example, a process of specifying the commodity product registration motion may include a process of specifying a commodity product registration motion in the case where a person puts at least one of the right hand and the left hand forward, a distance between one of the hands and the region on the image of the specified user terminal 100 is short, such as within a predetermined distance, and both hands stop for a certain period of time. In still another example, a process of specifying the commodity product registration motion may include a process of specifying a commodity product registration motion in the case where a distance between the hands and the region of the user terminal 100 is small, and furthermore, a distance between the region of the user terminal 100 and a region of interest (ROI) of a barcode for a commodity product is small. Moreover, the ROI of the barcode is a region that indicates the location of the barcode used for registering the commodity product included in the captured image, and is set in advance. Furthermore, the state in which the distance to each of the regions is small indicates a state in which, for example, a distance to the central coordinates of the region included in the image is small.

The generating unit 42 generates, from the captured image captured by the camera device 200, skeleton information on the person specified by the specifying unit 41.

The evaluating unit 43 changes, on the basis of the setting information specified by the specifying unit 41, a parameter for evaluating a behavior of a person exhibited with respect to the commodity product. The process of changing the subject parameter may include a process of changing a parameter with respect to a speed of a motion of taking out a commodity product from a commodity product shelf or the like or a motion of putting the commodity product into a basket. The process of changing the subject parameter may include a process of changing a difference in the detection time between a motion of putting the commodity product into the basket and a motion of registering the commodity product into the user terminal 100, that is, a process of changing a parameter with respect to an allowable extension of time. For example, in a case of a large-sized commodity product, it is conceivable to take a long time for each of the motions, the parameter for a speed with respect to each of the motions or the allowable extension of time between the motions is changed in order to be able to make an adjustment even in a case in which a motion is slower than that of a small-sized commodity product.

The evaluating unit 43 evaluates a behavior of a person exhibited with respect to a commodity product on the basis of each of the parameters. For example, the evaluating unit 43 may evaluate that a person behaves fraudulently in the case where a period of time between detection of a motion of putting a commodity product into a basket and detection of a motion of registering the commodity product into the user terminal 100 is not within the allowable extension of time, such as 10 seconds, that has been set by the parameter.

Furthermore, the process of evaluating the behavior of the person includes a process of evaluating the behavior, for example, by assigning a weight on the basis of an area in which the person is visiting at the time of detection of a specific motion, such as a motion of putting a commodity product into a basket, an age and a gender of the person, or the like. For example, by assigning a weight and evaluating a behavior in the case where an area in which a person is visiting at the time of detection of a motion of putting a commodity product into a basket is a sales floor for high-priced commodity products or in the case where the person is a teenage male who relatively and frequently exhibits a fraudulent behavior, it is possible to more easily detect a fraudulent behavior by more strictly defining an evaluation criterion. In contrast, in a case of an age group who exhibits less frequently a fraudulent behavior, evaluation may be performed by assigning a weight such that an evaluation criterion is relaxed.

If it is determined that a person has behaved fraudulently on the basis of the evaluation of a behavior obtained by the evaluating unit 43, the notifying unit 44 notifies the store clerk terminal 300 of an alert. Furthermore, the notification of the alert may be an output of a message, a sound, or the like. In addition, the notifying unit 44 is able to transmit, together with the notification of the alert, information for specifying a person who has behaved fraudulently, such as a captured image of, for example, the captured person who has behaved fraudulently, to the store clerk terminal 300. Furthermore, in the case where a plurality of persons are captured in the captured image, the notifying unit 44 may process the captured image by, for example, surrounding the person who has behaved fraudulently with a frame such that the person who has behaved fraudulently is easily specified.

Furthermore, if it is evaluated, by the evaluating unit 43, that the person has behaved fraudulently, the notifying unit 44 decides whether or not to notify an alert on the basis of a priority level. The priority level is a priority level of alerts in the case where it has been evaluated that a behavior of a person exhibited with respect to a commodity product is fraudulent. Furthermore, the notifying unit 44 decides the priority level on the basis of, for example, an area in which the person is visiting at the time of detection of a specific motion, such as a motion of putting a commodity product into a basket, an age and a gender of the person, or the like.

Details of Functions

Figure 8:
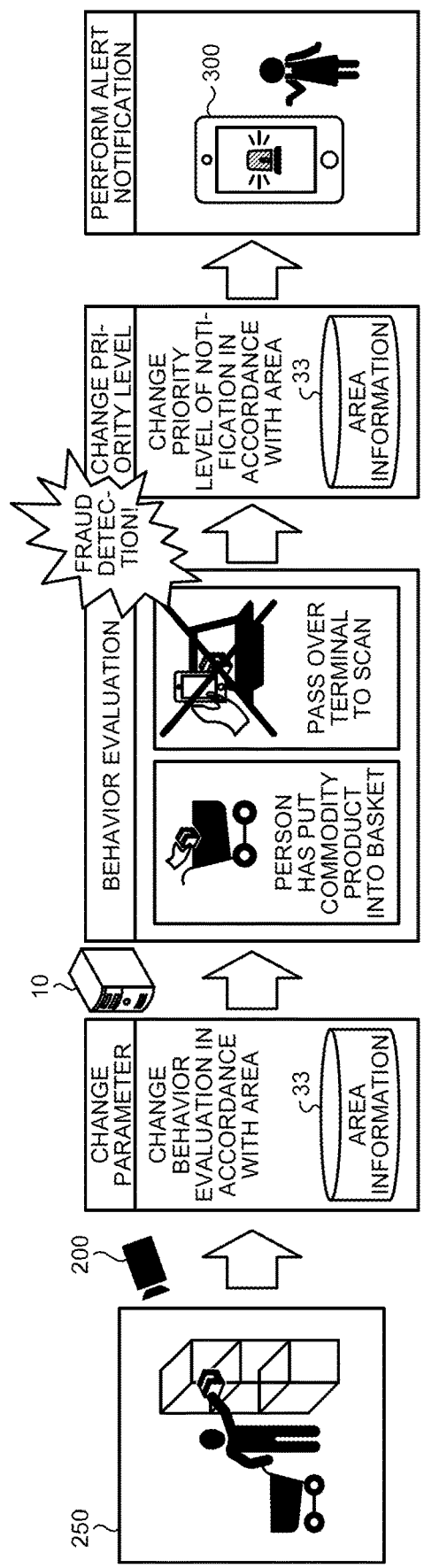
FIG. 8 is a diagram illustrating an example of a fraud detection process according to the first embodiment.

In the following, a fraud detection process performed by the fraud detection device 10 functioning as an actor will be described with reference to FIGS. 8 to 16. FIG. 8 is a diagram illustrating an example of a fraud detection process according to the first embodiment. A captured image 250 illustrated in FIG. 8 is an example of a captured image of inside a store of a retail store captured by the camera device 200. The fraud detection device 10 specifies a person or an object from the captured image 250. Specifying an object from the captured image 250 will be described with reference to FIG. 9.

Figure 9:
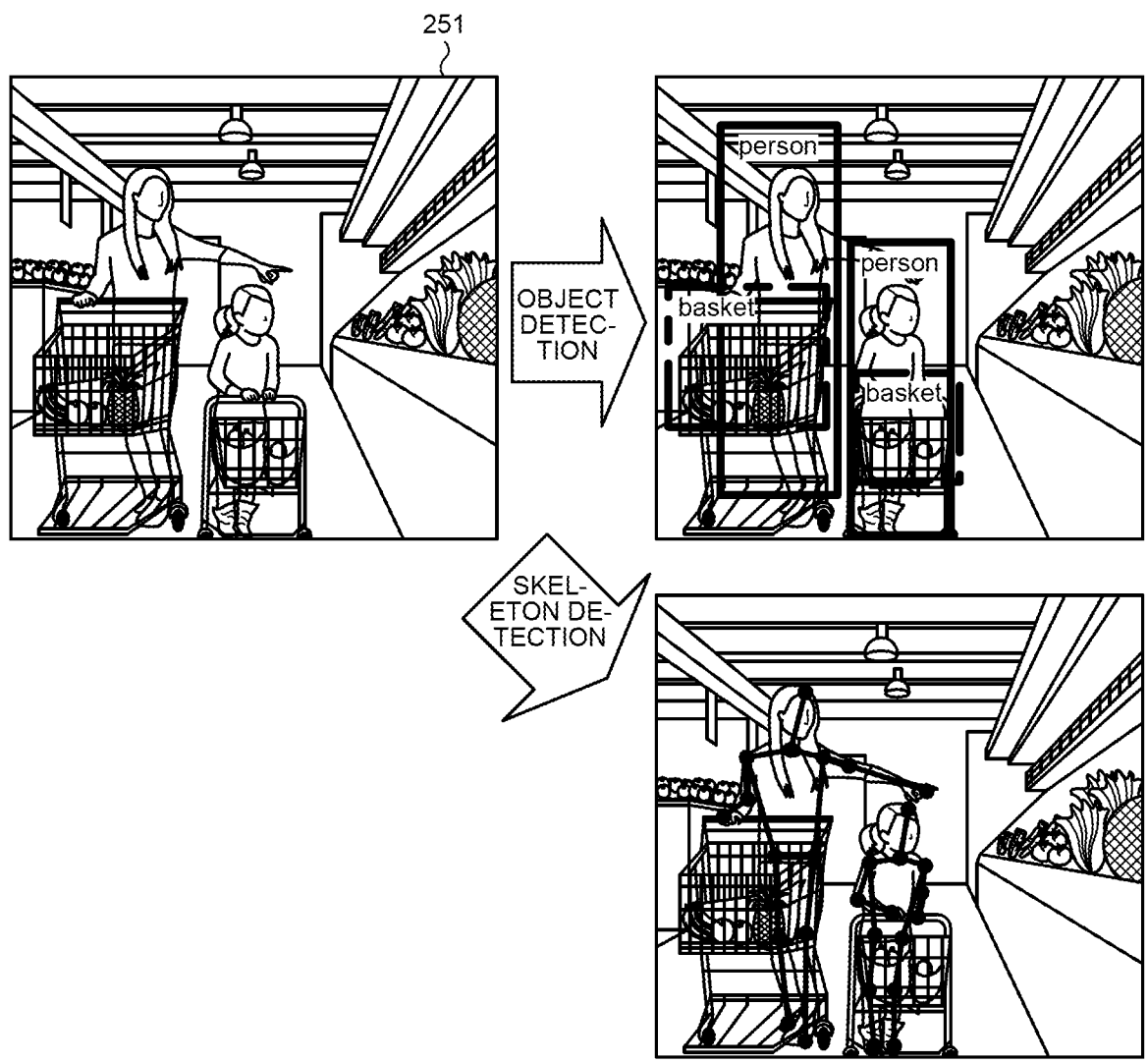
FIG. 9 is a diagram illustrating an example of object detection and skeleton detection according to the first embodiment.

FIG. 9 is a diagram illustrating an example of object detection and skeleton detection according to the first embodiment. As illustrated on the upper right part of FIG. 9, the fraud detection device 10 detects and specifies persons and baskets from a captured image 251 by using, for example, an existing object detection algorithm. The existing object detection algorithm mentioned here is, for example, an object detection algorithm using deep training, such as Faster Convolutional Neural Network (R-CNN). Furthermore, the existing object detection algorithm may be an object detection algorithm, such as You Only Look Once (YOLO) or Single Shot Multibox Detector (SSD).

Furthermore, other than the persons or the baskets, for example, commodity products, the user terminal 100, a sales floor or a shelf of the commodity products, a sales area of the commodity products, clothes of a person may be detected from the captured image. As a result, the fraud detection device 10 is able to detect a state in which, for example, a person does not perform self-scanning even though the person has the user terminal 100. Furthermore, the fraud detection device 10 is able to determine, for example, that the person is visiting which sales area in an attempt to purchase a commodity product. Furthermore, the fraud detection device 10 is able to exclude, for example, a person who does not carry the user terminal 100 or a person who wears a uniform of a store clerk from the target of the fraud detection process. In this way, the fraud detection device 10 excludes a person who need not to be subjected to fraud detection from the processing target, so that it is possible to reduce a processing load.

Furthermore, the fraud detection device 10 is able to determine an age of the person specified from the captured image by using, for example, an existing algorithm, and specify a group relationship, such as a parent and child relationship, between the persons. As a result, for example, in a case of the parent and child relationship, it may be determined that a scan omission of a commodity product does not occur as long as a commodity product scan is performed on one of the targeted persons.

Furthermore, as illustrated on the lower right part of FIG. 9, the fraud detection device 10 detects skeletons of persons specified by the captured image 251 by using, for example, an existing skeleton estimation algorithm. The existing skeleton estimation algorithm mentioned here is a skeleton estimation algorithm using deep training, such as Human Pose Estimation including Deep Pose, Open Pose, or the like.

Figure 22:
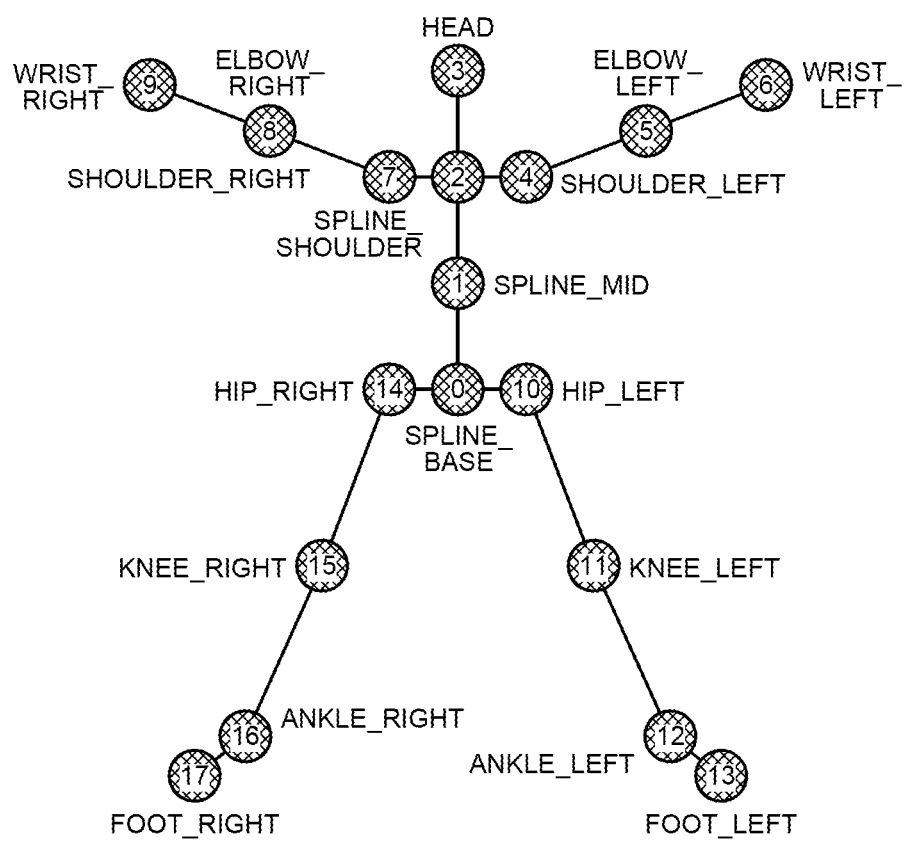
FIG. 22 is a diagram illustrating skeleton information.

For example, the fraud detection device 10 acquires skeleton information by inputting image data (each frame) to a practiced machine training model. FIG. 22 is a diagram illustrating an example of skeleton information. It is possible to use, for the skeleton information, 18 pieces (0 to 17) of definition information obtained by numbering each joint specified by a known skeleton model. For example, number 7 is assigned to a right shoulder joint (SHOULDER_RIGHT), number 5 is assigned to a left elbow joint (ELBOW_LEFT), number 11 is assigned to a left knee joint (KNEE_LEFT), and number 14 is assigned to a right hip joint (HIP_RIGHT). Therefore, the fraud detection device 10 is able to 18 pieces of skeleton coordinate information illustrated in FIG. 22 from the image data. For example, the fraud detection device 10 acquires, as the position of the right shoulder joint denoted by number 7, "X coordinate=X7, Y coordinate=Y7, and Z coordinate=Z7". Furthermore, for example, it is possible to define that the Z-axis is a distance direction in which an image capturing device is turned toward the target, the Y-axis is a height direction perpendicular to the Z-axis, and the X-axis is a horizontal direction.

Figure 23:
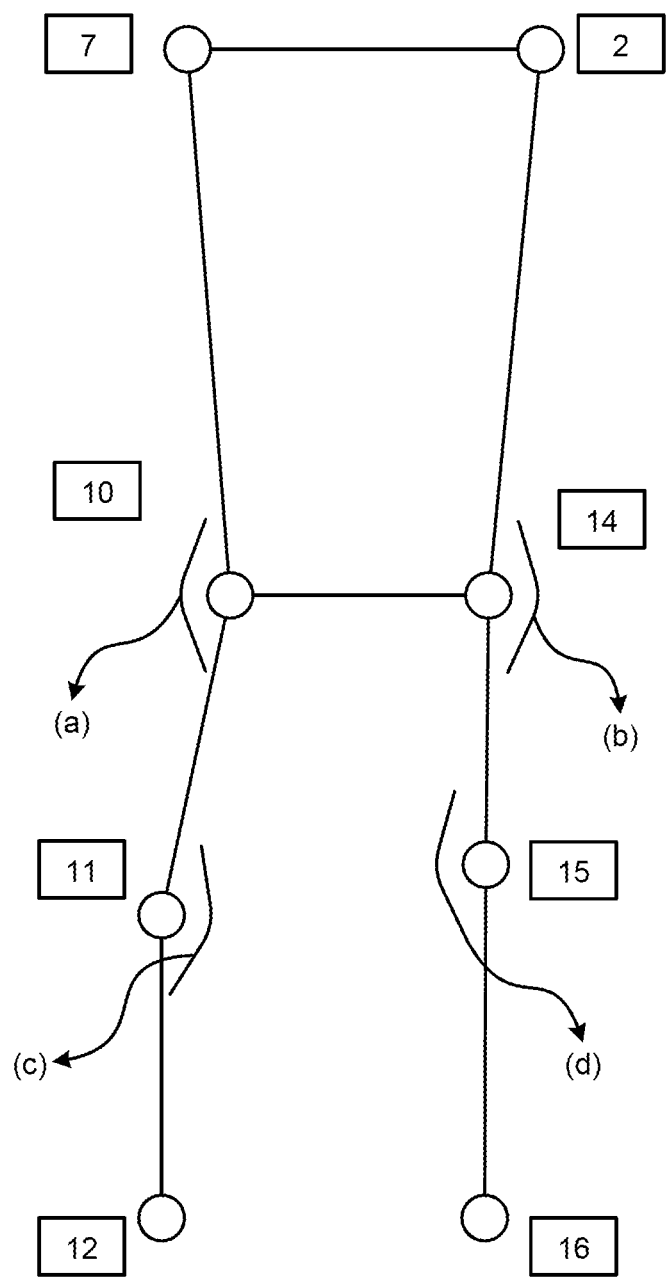
FIG. 23 is a diagram illustrating pose determination of the entire body.

Furthermore, the fraud detection device 10 is able to determine, by using a machine training model in which patterns of the skeletons are practiced in advance, a pose of the entire body, such as a pose of standing up, walking, squatting down, sitting down, and lying down. For example, by using a machine training model in which skeleton information illustrated in FIG. 22 obtained by practicing an angle between one of joints and the other joints using Multilayer Perceptron, the fraud detection device 10 is able to determine the most similar pose of the entire body. FIG. 23 is a diagram illustrating pose determination of the entire body. As illustrated in FIG. 23, the fraud detection device 10 is able to detect a pose of the entire body by acquiring an angle (a) of the joints between "HIP LEFT" denoted by number 10 and "KNEE_LEFT" denoted by number 11, an angle (b) of the joints between "HIP_RIGHT" denoted by number 14 and "KNEE_RIGHT" denoted by number 15, an angle (c) of "KNEE_LEFT" denoted by number 11, an angle (d) of "KNEE_RIGHT" denoted by number 15, or the like.

Furthermore, the fraud detection device 10 may estimate a pose by using a machine training model, such as Multi-Layer Perceptron, that is generated from machine training by defining an angle between one of joints and the other joints as a feature amount and defining a pose of the entire body, such as a pose of standing up or squatting down, as a correct answer label.

Furthermore, the fraud detection device 10 may use 3D Pose estimation, such as VNect, as a pose estimation algorithm, for estimating a three-dimensional pose from a single captured image. Furthermore, the fraud detection device 10 may estimate a pose from three-dimensional joint data by using, for example, 3d-pose-baseline that generates three-dimensional joint data from two-dimensional skeleton information.

Furthermore, the fraud detection device 10 may specify a motion of each part on the basis of an orientation of each of the parts, such as a face, an arm, an elbow of a person, or an angle at the time of bending each of the parts, and may estimate a pose of the person. Furthermore, the algorithm for the pose estimation or the skeleton estimation is not limited to one type. It is possible to estimate the poses or the skeletons in a mixed manner by using a plurality of algorithms.

Figure 10:
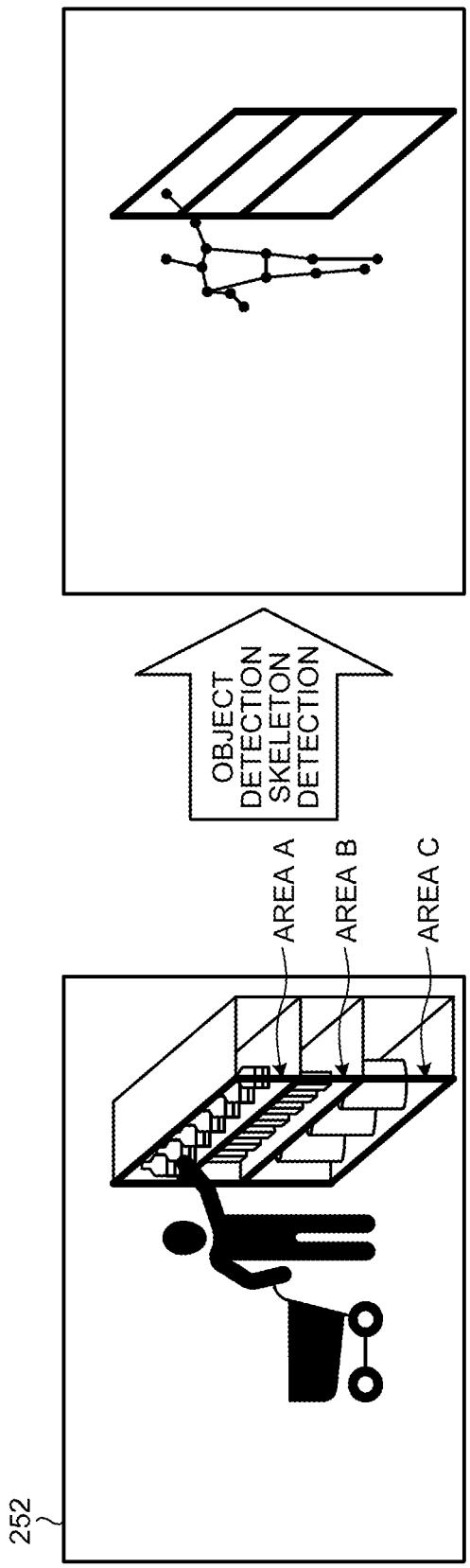
FIG. 10 is a diagram illustrating an example of specifying a motion of taking out a commodity product according to the first embodiment.

FIG. 10 is a diagram illustrating an example of specifying a motion of taking out a commodity product according to the first embodiment. As illustrated in FIG. 10, the fraud detection device 10 detects skeleton information on an area A, B, or C or a person from, for example, a captured image 252. In the example illustrated in FIG. 10, the area A, B, or C is a region of each of the shelves of the commodity product shelf; however, the area A, B, or C may be, for example, a larger region, such as units of sales floors. Each of the areas may be specified on the basis of positional information that is related to pixels included in the captured image and that is set in advance to the "area coordinates" of, for example, the area information 33.

Then, the fraud detection device 10 specifies, on the basis of each of the specified areas and the skeleton information on the person, a motion of the person taking out a commodity product from a shelf in which the commodity products are accommodated. More specifically, the fraud detection device 10 specifies a motion of the person taking out the commodity product placed in the area A in the case where, for example, after the hand of the person enters the region of the area A, the person adopts a pose of standing up, squatting down, or bending down and extends the arm including the subject hand forward, and the hand is moving at a speed greater than or equal to a predetermined speed. Here, it is possible to determine a state, in which the hand is moving at a speed greater than or equal to a predetermined speed, from the movement of the hand, that is, an amount of movement, specified from, for example, each of the captured images that are consecutively captured. Furthermore, the fraud detection device 10 is able to determine a movement of each of the commodity products and a movement of skeleton of the fingers specified from, for example, the captured image and is able to specify a more detailed motion, for example, specify whether a commodity product has been taken out, and further specify which of the commodity product has been taken out.

Figure 11:
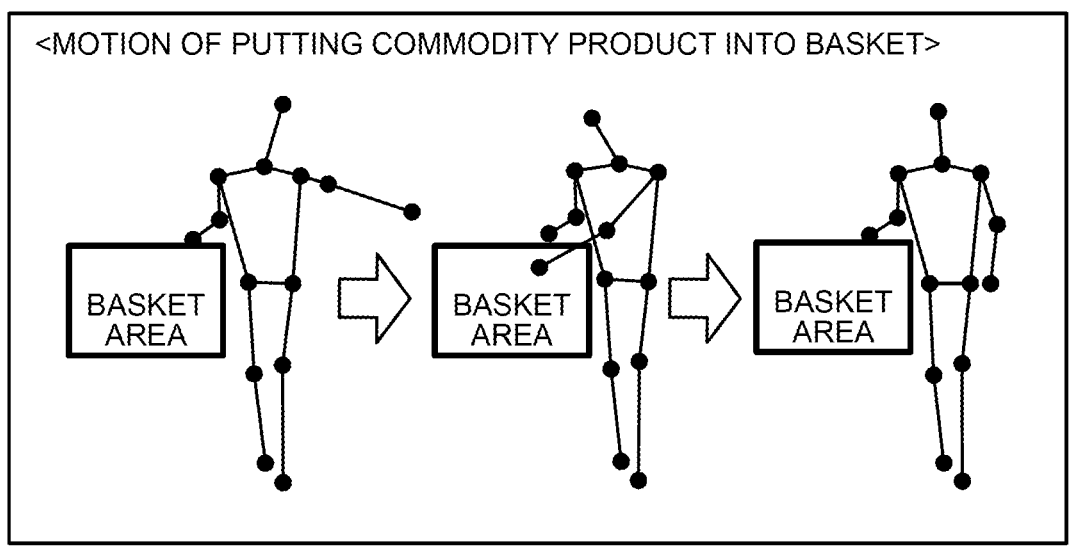
FIG. 11 is a diagram illustrating an example of specifying a motion of putting into a basket according to the first embodiment.

FIG. 11 is a diagram illustrating an example of specifying a motion of putting a commodity product into a basket according to the first embodiment. As illustrated in FIG. 11, the fraud detection device 10 specifies a motion of a person of putting a commodity product into a basket in the case where, for example, the hand of the person comes out from the region of the specified basket after the hand enters the region while moving at a speed greater than or equal to a predetermined speed. Furthermore, the fraud detection device 10 is able to determine a motion of each of the commodity products and a movement of the skeleton of the hand that are specified from, for example, the captured image and is able to specify a more detailed motion, for example, specify which of the commodity product has been put into the basket.

Figure 12:
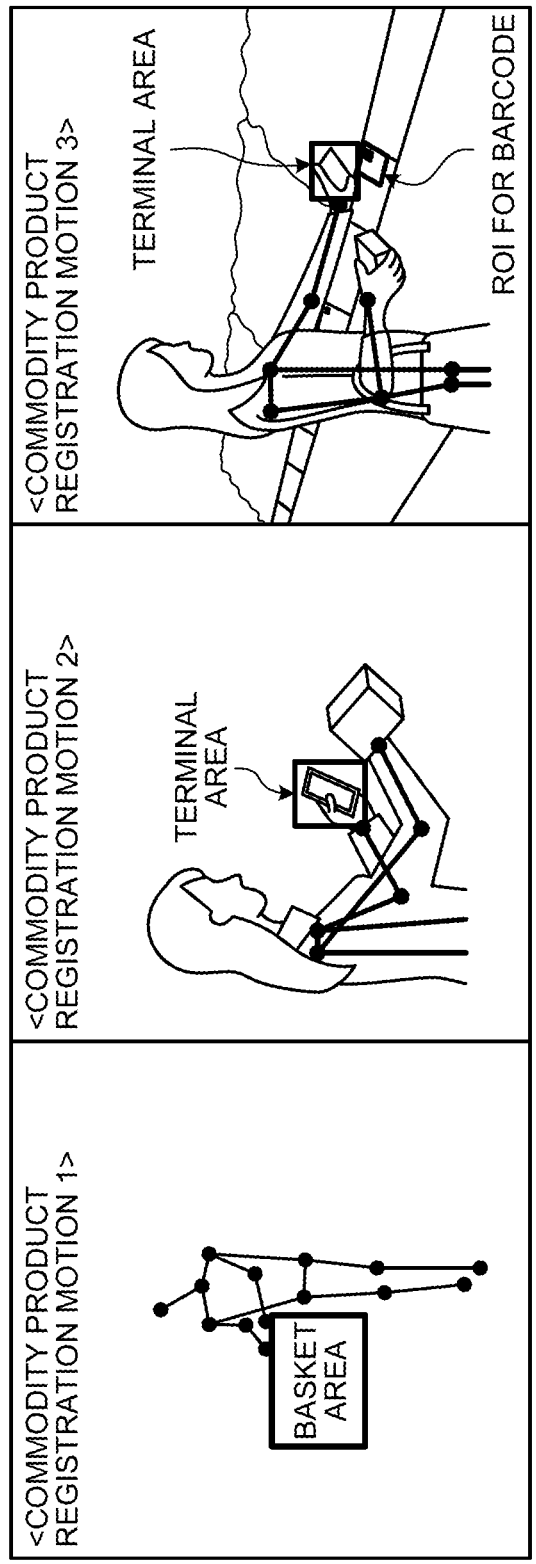
FIG. 12 is a diagram illustrating an example of specifying a motion of registering a commodity product according to the first embodiment.

FIG. 12 is a diagram illustrating an example of specifying a motion of registering a commodity product according to the first embodiment. FIG. 12 illustrates, as examples, three commodity product registration motions that are to be specified. For example, as illustrated in FIG. 12 as a commodity product registration motion 1, the fraud detection device 10 specifies a motion of a person registering a commodity product targeted for a purchase into the user terminal 100 in the case where both elbows of the person have not moved for a predetermined period of time while being bent forward within a predetermined range of the region of the specified basket.

Furthermore, as illustrated in FIG. 12 as a commodity product registration motion 2, a commodity product registration motion is specified in the case where at least one of the right hand or the left hand extends forward, the distance between one of the hand and the specified region on the image of the user terminal 100 is close, such as within a predetermined distance, and both hands stops for a certain period of time.

Furthermore, as illustrated in FIG. 12 as a commodity product registration motion 3, a commodity product registration motion is specified in the case where the distance between the hand and the region of the user terminal 100 is close, such as within a predetermined distance, and furthermore, the distance between the region of the user terminal 100 and ROI for a barcode for a commodity product is close, such as within a predetermined distance. Furthermore, the fraud detection device 10 is able to detect, for example, a surface of a barcode of each of the commodity products and specify a more detailed motion, such as a motion indicating which commodity product has been registered.

Furthermore, when the fraud detection device 10 specifies each of the motions, it is possible to reduce a processing load by generating and processing the skeleton information having a smaller amount of information from the captured images, instead of directly processing the captured image.

A description will be given here by referring back to FIG. 8. The fraud detection device 10 specifies, as described with reference to FIGS. 9 to 12, a person or an object from the captured image 250, and then, specifies a motion of taking out a commodity product of the specified person, a motion of putting a commodity product into a basket, and a motion of registering a commodity product registration. Furthermore, the fraud detection device 10 specifies an area in which a person is visiting at the time of detection of each of the motion from the captured image 250, and changes, in accordance with the specified area, the parameter for evaluating the behavior of the person exhibited with respect to the commodity product. The change in parameter mentioned here is a change in parameter with respect to, for example, a motion speed for specifying each of the motions, or a change in parameter with respect to an allowable extension of time between each of the motions. In the following, a change in each of the parameters will be described with reference to FIG. 13.

FIG. 13 is a diagram illustrating an example of a parameter change according to the first embodiment. The fraud detection device 10 changes, on the basis of setting information associated with the specified area, a parameter for evaluating a behavior of a person exhibited with respect to a commodity product. The pieces of information of "area", "area coordinates", and "shelf section" illustrated in FIG. 13 are the same information as those included in the area information 33 illustrated in FIG. 6, and are the pieces of information that are associated with each of the areas that can be specified, by the fraud detection device 10, as areas in which respective persons are visiting.

In contrast, the items of a "speed X of a motion of taking out a commodity product from a shelf", a "speed Y of a motion of putting a commodity product into a basket", and "time T needed to register a commodity product" are the parameters for evaluating a behavior of a person exhibited with respect to a commodity product. The "speed X of a motion of taking out a commodity product from a shelf" and the "speed Y of a motion of putting a commodity product into a basket" each are a threshold of an amount of movement of the hand included in, for example, the captured images that are consecutively captured. In the case where, for example, the hand is moving at a speed greater than or equal to the threshold and another condition of each of the motions is satisfied, the fraud detection device 10 determines, that the motion of the subject hand is a motion of taking out a commodity product from a shelf or a motion of putting a commodity product into a basket. In other words, even if the conditions of the respective motions are satisfied, if a speed of the hand is less than the threshold, it is not determined to be the respective motions. As illustrated in FIG. 13, the "speed X of a motion of taking out a commodity product from a shelf" and the "speed Y of a motion of putting a commodity product into a basket" are set for each area, and are changed in accordance with the specified area at the time of evaluation of a behavior of a person.

In this way, the fraud detection device 10 is able to prevent continuation of an unneeded process occurring after erroneous detection of the unneeded motion while improving detection accuracy of each of the motions, and is able to reduce a processing load. Furthermore, set values of the "speed X of a motion of taking out a commodity product from a shelf" and the "speed Y of a motion of putting a commodity product into a basket" illustrated in FIG. 13 are only examples, the upper limit of the threshold may be set instead of the lower limit. In this case, in the case where the hand is moving at a speed within the upper limit, and another condition of each of the motions is satisfied, it is determined that the motion of the hand is a motion of taking out a commodity product from a shelf or a motion of putting the commodity product into a basket.

The "time T needed to register a commodity product" is a threshold of a period of time (second) from when, for example, a commodity product is put into a basket until the commodity product is registered to the user terminal 100. The fraud detection device 10 evaluates that a person behaves fraudulently in the case where, a period of time between, for example, detection of a motion of putting a commodity product into a basket and detection of a motion of registering the commodity product to the user terminal 100 exceeds the "time T needed to register a commodity product". Furthermore, there may be a case in which a commodity product is registered to the user terminal 100 and then the commodity product is put into the basket; however, in this case, a period of time to the detection of the motion of registering the commodity product results in a minus time, so that the obtained result does not exceed the "time T needed to register a commodity product", and thus, it is not evaluated that the person behaves fraudulently.

Furthermore, the thresholds that are set to the "speed X of a motion of taking out a commodity product from a shelf", the "speed Y of a motion of putting a commodity product into a basket", and the "time T needed to register a commodity product" may be adjusted by machine training or the like on the basis of the actual motion of the customer. For example, in the example illustrated in FIG. 13, 15 seconds are set to the "time T needed to register a commodity product" in the area C; however, the value may be adjusted to a value, such as 20 seconds or 25 seconds, in the case where the obtained result of detecting the actual motion of each of the customers indicates that there is a certain number of cases in which the period of time needed to register a commodity product is larger than or equal to 15 seconds.

Figure 14:
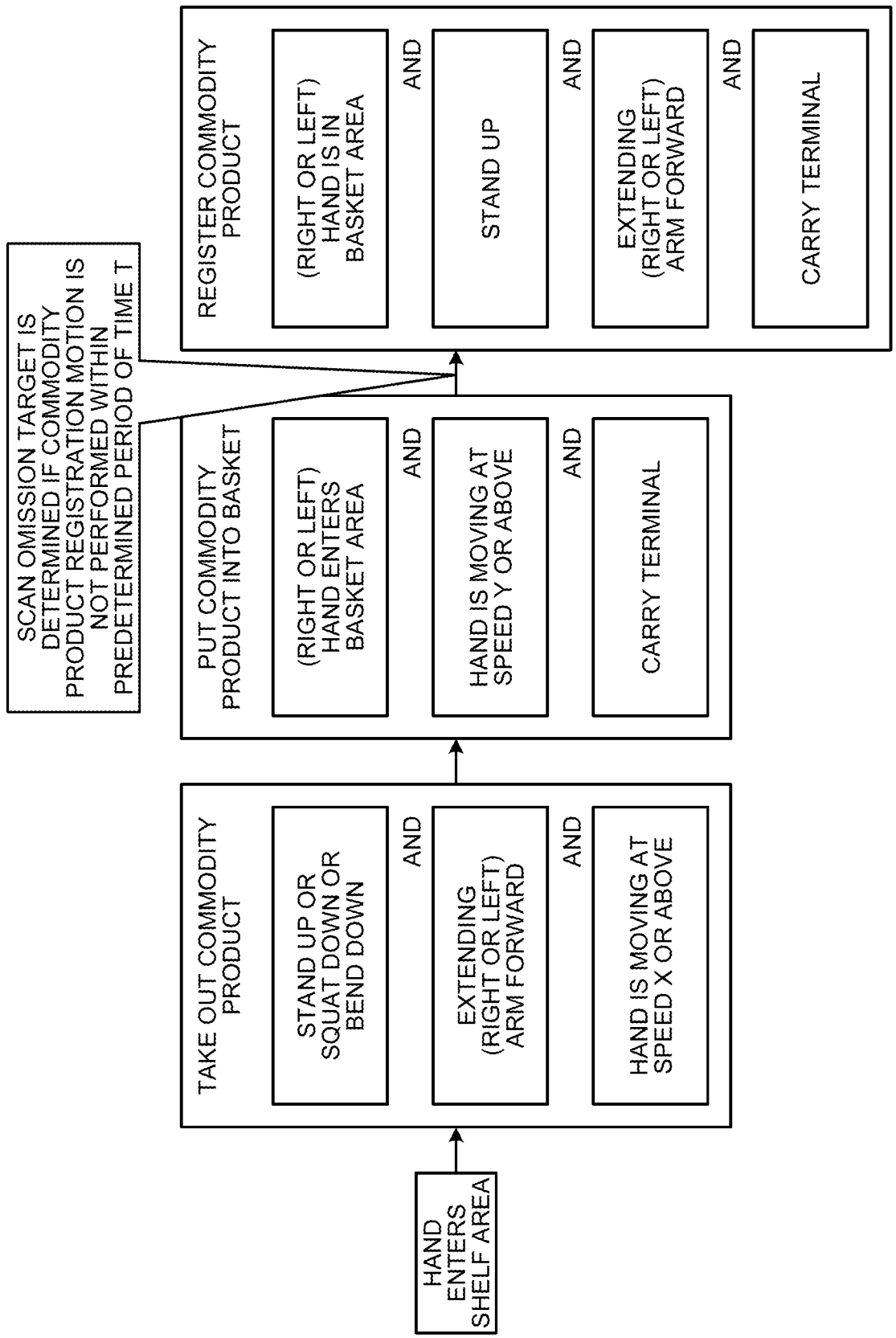
FIG. 14 is a diagram illustrating an example of behavior evaluation according to the first embodiment.

A description will be given again here by referring back to FIG. 8. As described above with reference to FIG. 13, the fraud detection device 10 changes each of the parameters used for evaluating a behavior of a person exhibited with respect to a commodity product in accordance with the specified area. Then, the fraud detection device 10 evaluates, on the basis of each of the parameters and each of the motions of the person specified from the captured image 250, the behavior of the person exhibited with respect to the commodity product. FIG. 14 is a diagram illustrating an example of behavior evaluation according to the first embodiment.

The example of the behavior evaluation illustrated in FIG. 14 indicates that the motion of the person included in the captured image is determined in four stages, and a behavior of the person is evaluated. First, as a first stage, the fraud detection device 10 uses the skeleton information on the person and the commodity product shelf that is specified from the captured image, and determines whether the hand of the person in the captured image is included in a predetermined region that indicates the commodity product shelf.

Then, in the case where the hand of the person enters the region of the commodity product shelf, the fraud detection device 10 determines, as a second stage by using the skeleton information on the person and the commodity product shelf that has been specified from the captured image, whether or not the person has taken out the commodity product from the commodity product shelf. Regarding the determination whether or not the person has taken out the commodity product, the fraud detection device 10 determines that the person has taken out the commodity product from the commodity product shelf in the case where, for example, the person adopts a pose of standing up, squatting down, or bending down and extends the arm including the subject hand forward that enters the region of the commodity product shelf, and the hand is moving at a speed greater than or equal to the speed X that is a predetermined speed.

Then, in the case where the person has taken out the commodity product from the commodity product shelf, the fraud detection device 10 determines, as a third stage by using the skeleton information on the person and the basket that has been specified from the captured image, whether or not the person has put the taken out commodity product into the basket. Regarding the determination whether or not the person has put the commodity product into the basket, the fraud detection device 10 determines that the person has put the commodity product into the basket in the case where, for example, the hand of the person came out from the region after the hand enters the region while moving at a speed greater than or equal to the speed Y that is a predetermined speed. Furthermore, it may be possible to define a state in which, by using the user terminal 100 that has been further specified from the captured image, the distance between the hand of the person and the region of the user terminal 100 is close, such as within a predetermined distance, and the person carries the user terminal 100 as one of conditions for determining whether or not the person has put the taken out commodity product into the basket.

Then, in the case where the person puts the commodity product into the basket, the fraud detection device 10 determines, as a fourth stage by using the skeleton information on the person and the basket that has been specified from the captured image, whether or not the person has scanned the commodity product contained in the basket and registered the commodity product to the user terminal 100. Regarding the determination whether or not the person has registered the commodity product, the fraud detection device 10 determines that the person has registered the commodity product to the user terminal 100 in the case where, for example, the person adopts a pose of standing up and extends the arm forward, and the hand enters the region of the basket. Furthermore, in this case, also, a state in which the person carries the user terminal 100 may be regarded as one of the conditions of determining a motion.

Then, in the case where it is determined that, after the person has put the commodity product into the basket, a motion of registering the commodity product to the user terminal 100 is not performed within the predetermined period of time T, the fraud detection device 10 determines that the person is a target person for a scan omission. Furthermore, in the example illustrated in FIG. 14, the motions of the person are determined in four stages; however, the determination may be performed in stages less than four or larger than four. Furthermore, the fraud detection device 10 may specify a person attribute, such as an age and a gender of the person, from the captured image 250, and may evaluate a behavior by assigning a weight on the basis of the specified person attribute.

Furthermore, as illustrated in FIG. 14, by performing behavior evaluation of the person in stages, in the case where the obtained result does not match the determination condition of each of the stages, the fraud detection device 10 need not to perform the subsequent processes after that, and it is thus possible to reduce a processing load. The determination process performed in stages in this way is suitable for the present embodiment in which the number of determination conditions for evaluating a fraudulent behavior of a customer increases in accordance with, for example, a combination of the number of areas and a behavior of a customer, and thus, an amount of throughput for detecting a fraudulent behavior increases.

Figure 15:
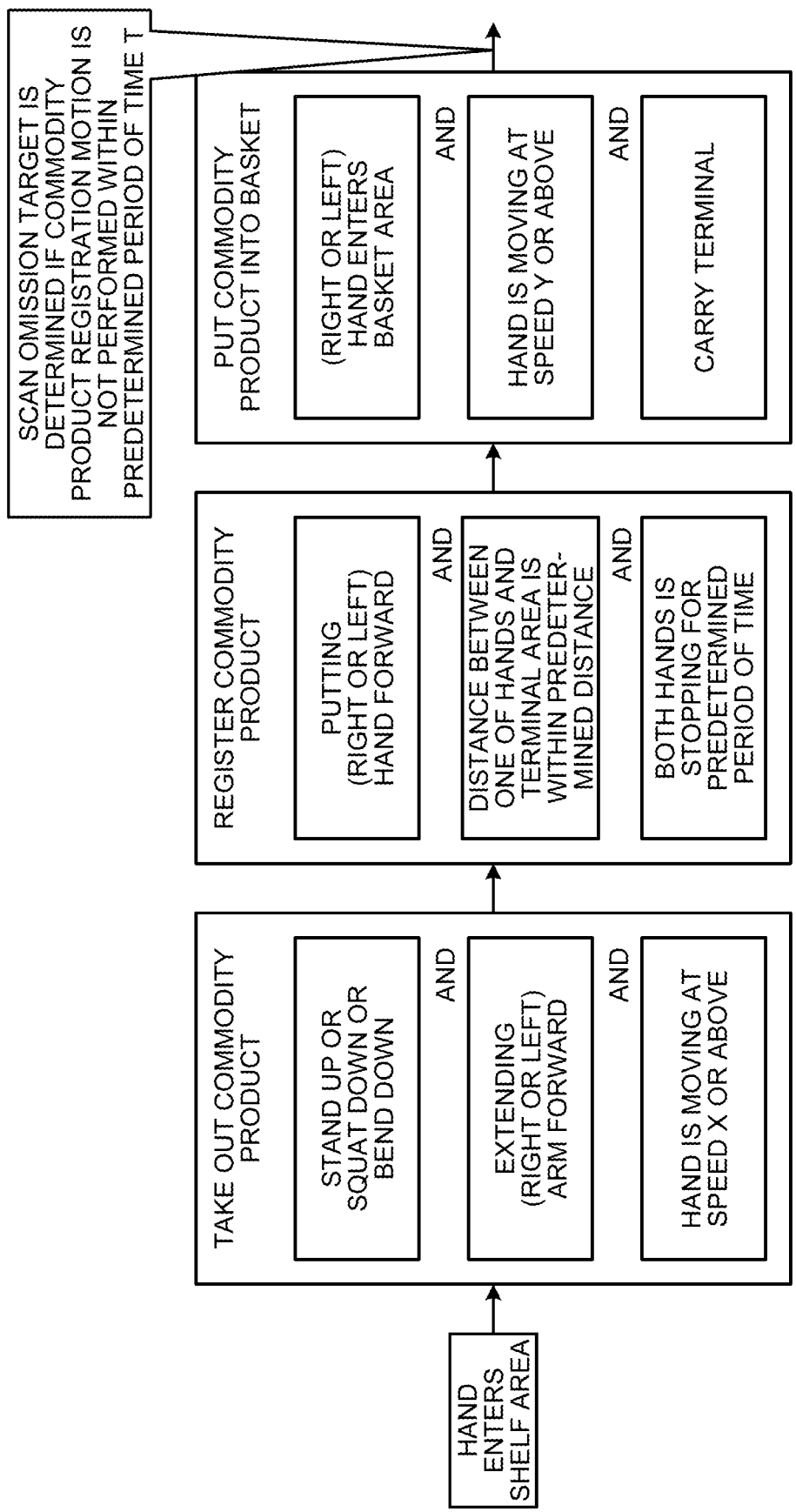
FIG. 15 is a diagram illustrating another example of behavior evaluation according to the first embodiment.

Furthermore, the example illustrated in FIG. 14 indicates a pattern of putting the commodity product into the basket and then registering the commodity product to the user terminal 100; however, the fraud detection device 10 is also able to perform behavior evaluation using the pattern of registering the commodity product to the user terminal 100 and then putting the commodity product into the basket. FIG. 15 is a diagram illustrating another example of the behavior evaluation according to the first embodiment.

In also the other example of the behavior evaluation illustrated in FIG. 15, similarly to the example illustrated in FIG. 14, the motion of the person included in the captured image is determined in four stages, and a behavior of the person is evaluated. The determination performed in the first stage and the second stage in the example illustrated in FIG. 15 is the same as that in the example illustrated in FIG. 14.

Then, in the case where the person has taken out the commodity product from the commodity product shelf, the fraud detection device 10 determines, as the third stage by using the skeleton information on the person and the user terminal 100 that has been specified from the captured image, whether or not the person has scanned the taken out commodity product and registered the commodity product to the user terminal 100. Regarding the determination whether or not the person has registered the commodity product, the fraud detection device 10 determines that the person has registered the commodity product in the case where, for example, the person extends at least one of the right hand and the left hand forward, the distance between one of the hands and the region of the user terminal 100 on the image is close, such as within a predetermined distance, and both of the hands stop for a certain period of time.

Then, in the case where the commodity product taken out by the person is registered to the user terminal 100, the fraud detection device 10 determines, as the fourth stage by using the skeleton information on the person and the basket that has been specified from the captured image, whether or not the person has put the taken out commodity product into the basket. The determination condition for a motion of putting a commodity product into a basket in the fourth stage is the same determination condition used in the third stage indicated in, for example, FIG. 13.

Then, it is determined that a motion of registering the commodity product to the user terminal 100 is not performed within the predetermined period of time T after the person has put the commodity product into the basket, the fraud detection device 10 determines that the person is a target person for a scan omission. The determination condition for a target for a scan omission is the same as the determination condition illustrated in FIG. 14. The reason is that, in the pattern of registering the commodity product to the user terminal 100 and then putting the commodity product into the basket as illustrated in FIG. 15, a period of time between detection of the motion of putting the commodity product into the basket and detection of the motion of registering the commodity product is a minus time; however, the condition in which, a state is the predetermined period of time T in a case of a minus time, is satisfied.

A description will be given here by referring back to FIG. 8. As described above with reference to FIGS. 14 and 15, the fraud detection device 10 evaluates a behavior of a person exhibited with respect to a commodity product by determining each of the motions of the person in stages, and detects a target for a scan omission as a fraudulent behavior. Then, the fraud detection device 10 is able to notify the store clerk terminal 300 of all of the detected fraudulent behaviors as alerts; however, if the alerts are uniformly notified regardless of the degree of importance of a commodity product or the degree of attention of a sales area, a problem such as a delay with respect to a commodity product having a high degree of importance may possibly occur. In addition, an amount of throughput of the fraud detection device 10 also increases. Furthermore, the possibility of exhibiting a fraudulent behavior varies in accordance with the person attribute, such as an age or a gender, so that it is conceivable to easily detect a fraudulent behavior by more strictly defining an alert notification criterion for a person who is highly likely to exhibit a fraudulent behavior. Thus, the present embodiment controls a notification of an alert in accordance with a priority level after having changed the priority level of the alert notification in accordance with an area in which a fraudulent behavior has been detected or a person attribute of a person who exhibits a fraudulent behavior.

Figure 16:
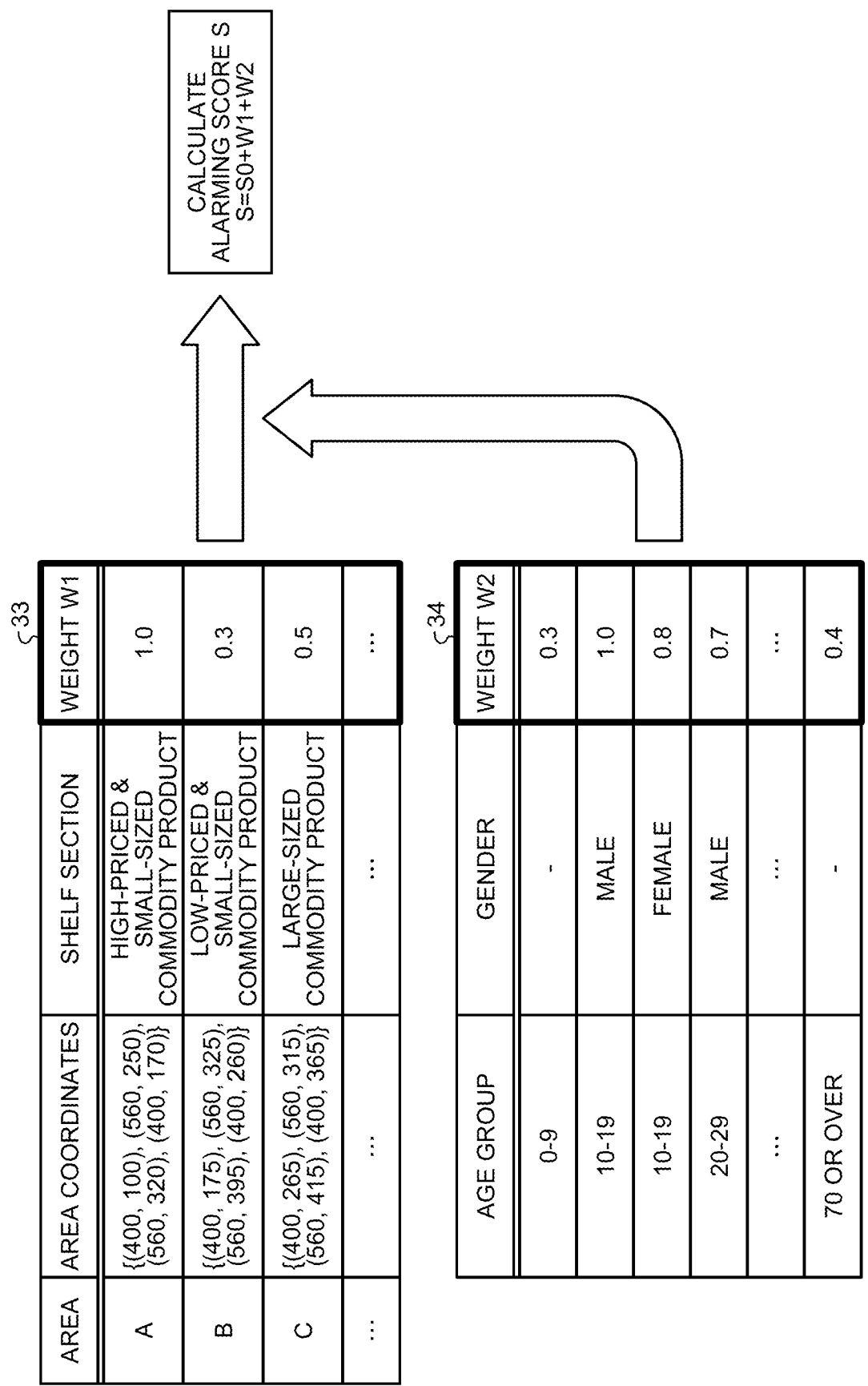
FIG. 16 is a diagram illustrating an example of a change in a priority level an alert notification according to the first embodiment.

FIG. 16 is an example of a change in a priority level of an alert notification according to the first embodiment. The information illustrated on the upper part of FIG. 16 is the area information 33 illustrated in FIG. 6. Furthermore, the information illustrated on the lower part of FIG. 16 is the person attribute information 34 illustrated in FIG. 7. As illustrated in FIG. 16, the fraud detection device 10 acquires, from the area information 33, the weight W1 associated with the area in which a fraudulent behavior has been detected, and furthermore, acquires, from the person attribute information 34, a weight W2 associated with the person attribute of the person who has exhibited a fraudulent behavior. Then, the fraud detection device 10 calculates an alarming score S that is an example of a priority level of an alert notification. For example, as the alarming score S is higher, an alert is notified more promptly with priority. Furthermore, the alarming score S is calculated from an equation indicated by, for example, "alarming score S=current alarming score S0+weight W1+weight W2". Here, the current alarming score S0 is, for example, the current alarming score for cumulatively calculating the alarming score S in the case where the same person repeats a fraudulent behavior multiple times, and the initial value is zero. Furthermore, the weight that is used at the time of calculation of the alarming score S may be one of the weight W1 and the weight W2. In this way, by cumulatively calculating the alarming score S, it is possible to perform control such that an alert is notified with priority with respect to the person who repeatedly exhibits fraudulent behaviors.

Flow of Process

Figure 17:
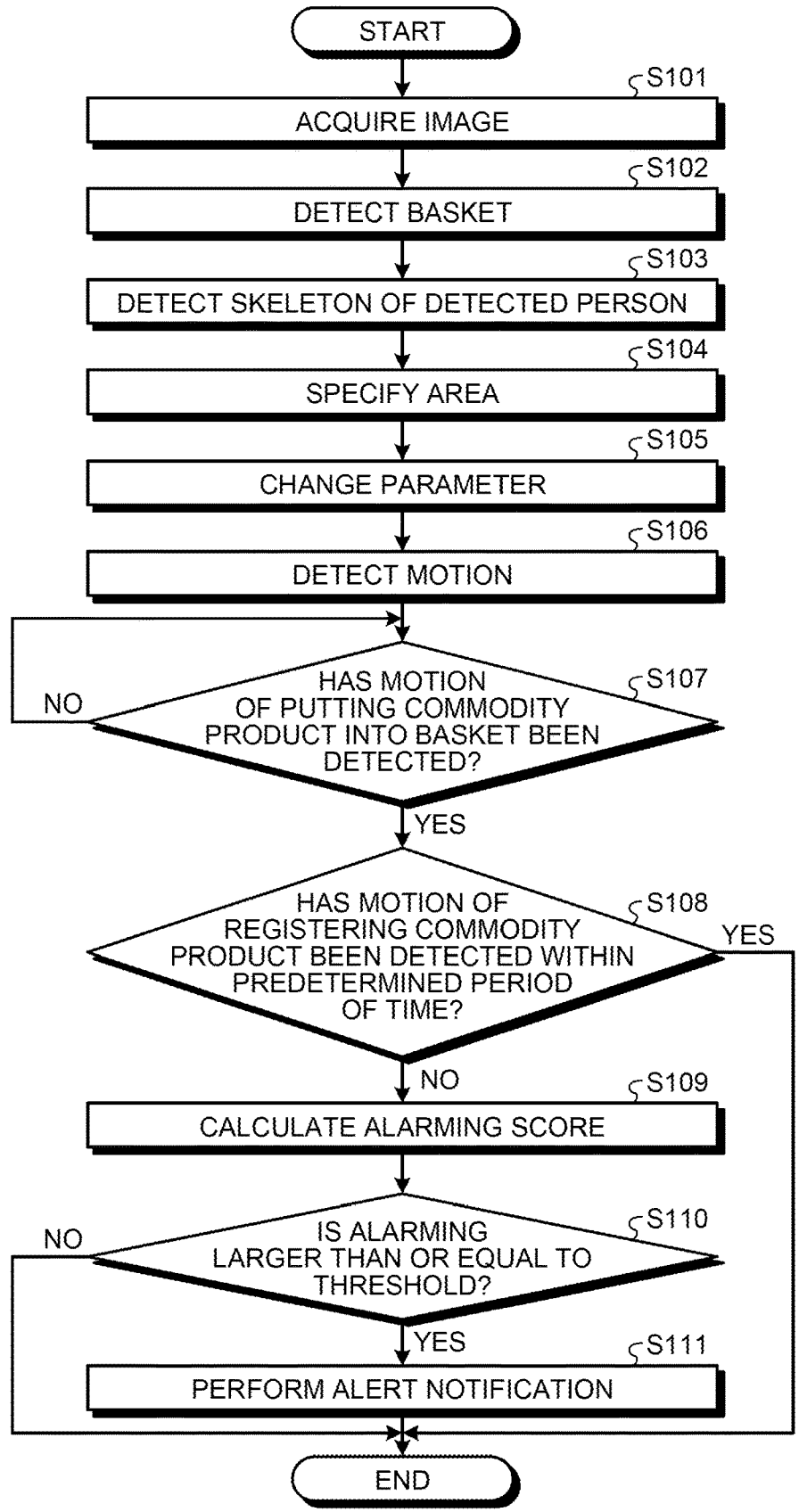
FIG. 17 is a flowchart illustrating the flow of a fraud detection process according to the first embodiment.

In the following, the flow of a fraud detection process performed by the fraud detection device 10 will be described. FIG. 17 is a flowchart illustrating the flow of the fraud detection process according to the first embodiment. The fraud detection process illustrated in FIG. 17 may be performed, for example, at fixed intervals, or every time a captured image is received from the camera device 200.

First, as illustrated in FIG. 17, the fraud detection device 10 acquires, from the image DB 31, a captured image of a predetermined image capturing range, such as inside or the site of the store of the retail store, captured by the camera device 200 (Step S101). Furthermore, in the fraud detection process illustrated in FIG. 17, in order to process the captured image captured by the camera device 200, in a precise sense, a monitoring video image in real time, the captured image is transmitted from the camera device 200 as needed, and is stored in the image DB 31.

Then, the fraud detection device 10 detects, by using an existing object detection algorithm, a shopping basket from the captured image acquired at Step S101 (Step S102).

Then, the fraud detection device 10 detects, by using an existing object detection algorithm, a person from the captured image acquired at Step S101, and furthermore, detects, by using the existing pose estimation and skeleton estimation algorithms, the skeleton of the detected person (Step S103). Furthermore, the order of the processes performed at Steps S102 and S103 may be reverse order, or the processes at Steps S102 and S103 may be performed in parallel.

Then, the fraud detection device 10 specifies the area in which the person detected at Step S103 is visiting (Step S104). Furthermore, the area in which the person is visiting is able to be specified by using positional information between, for example, the person included in the captured image and the sales floor or the shelf of the commodity product.

Then, the fraud detection device 10 changes the parameter for evaluating the behavior of the person exhibited with respect to the commodity product on the basis of the setting information associated with the area that is specified at Step S104 (Step S105).

Then, the fraud detection device 10 detects the motions of the person on the basis of the basket detected at Step S102, the skeleton detected at Step S103, and the like (Step S106). The motion detected at Step S106 is, for example, the motion of the person taking out the commodity product from the shelf in which the commodity product is accommodated, the motion of the person putting the commodity product into the basket, and the motion of the person scanning and registering the commodity product targeted for a purchase with respect to the user terminal 100.

In addition, the motion of taking out the commodity product is specified in the case where, for example, after the hand of the person enters the region of the commodity product shelf or the like, the person adopts a pose of standing up, squatting down, or bending down and extends the arm including the subject hand forward, and the hand is moving at a speed greater than or equal to a predetermined speed. Furthermore, the motion of putting the commodity product into the basket is specified in the case where, for example, the skeleton of the fingers of the person has come out from the region of the basket after the fingers entered the region for a predetermined period of time. Furthermore, the motion of registering the commodity is specified in the case where, for example, both elbows of the person have not moved for a predetermined period of time while being bent forward within a predetermined range of the region of the basket. Furthermore, in order to specify the motion of the person, the captured images that are consecutively captured and the basket and the skeleton information that are detected from these captured images are needed. Accordingly, at the time of process performed at Step S106, the processes at Steps S101 to S103 may be repeatedly performed a predetermined number of times by using different captured images. Furthermore, the process at Step S106 may be performed before the processes at Steps S104 and S105 are performed, or these processes may be performed in parallel.

If the motion of putting the commodity product into the basket is not detected at the process of detecting the motion performed at Step S106 (No at Step S107), the fraud detection device 10 again performs the process at Step S107 after elapse of a predetermined period of time.

In contrast, if the motion of putting the commodity product into the basket is detected at the process of detecting the motion performed at Step S106 (Yes at Step S107), the fraud detection device 10 determines whether or not the motion of registering the commodity product has been detected within the predetermined period of time after the detection of the motion of putting the commodity product into the basket (Step S108). If the motion of registering the commodity product has been detected within the predetermined period of time (Yes at Step S108), the fraud detection process illustrated in FIG. 17 is ended regarding that scan omission of the commodity product does not occur. Furthermore, if the motion of registering the commodity product is performed earlier than the motion of putting the commodity product into the basket, this state corresponds to the case where the motion of registering the commodity product has been detected within the predetermined period of time (Yes at Step S108) because the period of time until the detection of the motion of registering the commodity product becomes a minus time with respect to the motion of putting the commodity product into the basket.

In contrast, if the motion of registering the commodity product is not detected within the predetermined period of time (No at Step S108), the fraud detection device 10 calculates the alarming score that indicates the priority level of the alert notification (Step S109). The alarming score S is calculated by using the equation of, for example, "alarming score S=current alarming score S0+weight W1 associated with the area in which the fraudulent behavior has been detected+weight W2 associated with the person attribute of the person who exhibits the fraudulent behavior".

Then, the alarming score calculated at Step S109 is larger than or equal to the predetermined threshold that is set in advance (Yes at Step S110), the fraud detection device 10 notifies the store clerk terminal 300 of the alert (Step S111). After having performed the process at Step S111, the fraud detection process illustrated in FIG. 17 is ended.

In contrast, if the alarming score calculated at Step S109 is less than the predetermined threshold that is set in advance (No at Step S110), the fraud detection process illustrated in FIG. 17 is ended without notifying the store clerk terminal 300 of the alert. In this case, the fraud detection process illustrated in FIG. 17 is repeated again from the Step S101 after, for example, elapse of a predetermined period of time, and the alert is notified in the case where the alarming score is larger than or equal to the threshold.

Effects

As described above, the fraud detection device 10 generates, from the captured image, the skeleton information on a person who is visiting the store; detects, by using the skeleton information, a specific motion of the person made with respect to the commodity product; specifies, by using the positional information on the person included in the image, the area in which the person is visiting at the time of detection of the specific motion in the store; specifies the setting information associated with the specified area; and decides, on the basis of the specified setting information, the priority level of a notification of the alert related to the specific motion of the person exhibited with respect to the commodity product.

In this way, the fraud detection device 10 decides the priority level of the alert notification on the basis of the sales area that is associated with the commodity product and in which the person is visiting at the time of detection of the specific motion. As a result, in the system in which the customers performs commodity product scan by themselves, the fraud detection device 10 is able to decide the priority level that is to be responded and that is associated with a fraudulent behavior for each commodity product.

Furthermore, the process of detecting the specific motion performed by the fraud detection device 10 includes a process of detecting, as the specific motion, at least one of the first motion of the person taking out the commodity product from the shelf in which the commodity product is accommodated, the second motion of the person putting the commodity product that has been taken out from the shelf into the shopping basket, and the third motion of the person registering the commodity product that has been taken out from the shelf by the person to the first terminal.

Accordingly, the fraud detection device 10 decides the priority level of the alert notification at the time of the fraudulent behavior on the basis of the sales area that is associated with the commodity product and in which the person is visiting at the time of detection of the specific motion, such as the motion of taking out the commodity product. As a result, in the system in which the customers performs commodity product scan by themselves, the fraud detection device 10 is able to determine the priority level that is to be responded and that is associated with the fraudulent behavior for each commodity product.

Furthermore, the fraud detection device 10 evaluates the behavior of the person exhibited with respect to the commodity product on the basis of the parameter for evaluating the behavior of the person exhibited with respect to the commodity product.

Accordingly, the fraud detection device 10 is able to more accurately determine the motions that are associated with the customer and that vary in accordance with, for example, the type or the size of the commodity product; therefore, in the system in which the customers performs a commodity product scan by themselves, it is possible to improve the accuracy of detecting a scan omission of the commodity product.

Furthermore, the fraud detection device 10 changes the parameter for evaluating the behavior of the person exhibited with respect to the commodity product on the basis of the specified setting information.

Accordingly, the fraud detection device 10 evaluates the behavior of the person on the basis of the sales area that is associated with the commodity product and in which the person is visiting at the time of detection of the specific motion, so that it is possible to more accurately determine the motions that are associated with the customer and that vary in accordance with, for example, the type or the size of the commodity product.

Furthermore, the process of changing the parameter performed by the fraud detection device 10 includes a process of changing, as the parameter, the first parameter with respect to the speed of the first motion.

Accordingly, the fraud detection device 10 is able to more accurately determine the motions that are associated with the customer and that vary in accordance with, for example, the type or the size of the commodity product; therefore, in the system in which each of the customers performs a commodity product scan by themselves, it is possible to improve the accuracy of detecting the scan omission of the commodity product.

Furthermore, the process of changing the parameter performed by the fraud detection device 10 includes a process of changing, as the parameter, the second parameter with respect to the speed of the second motion.

Accordingly, the fraud detection device 10 is able to more accurately determine the motions that are associated with the customer and that vary in accordance with, for example, the type or the size of the commodity product; therefore, in the system in which each of the customers performs a commodity product scan by themselves commodity product, it is possible to improve the accuracy of detecting the scan omission of the commodity product.

Furthermore, the process of changing the parameter performed by the fraud detection device 10 includes a process of changing, as the parameter, a third parameter with respect to the difference in the detection time between the second motion and the third motion.

Accordingly, the fraud detection device 10 is able to more accurately determine the motions that are associated with the customer and that vary in accordance with, for example, the type or the size of the commodity product; therefore, in the system in which each of the customers performs a commodity product scan by themselves commodity product, it is possible to improve the accuracy of detecting the scan omission of the commodity product.

Furthermore, the process of deciding the priority level performed by the fraud detection device 10 includes a process of deciding the priority level on the basis of at least one of an age and a gender of the person.

Accordingly, the fraud detection device 10 is able to decide the priority level that is to be responded and that is associated with the commodity product, or an age or a gender of the person.

Furthermore, the fraud detection device 10 decides whether or not to send a notification of the alert on the basis of the priority level in the case where it is evaluated, by the process of evaluating the behavior, that the person has behaved fraudulently, and notifies the second terminal of the alert.

Accordingly, in the system in which the customers performs commodity product scan by themselves, in the case where the fraud detection device 10 has detected the scan omission of the commodity product, the fraud detection device 10 is able to notify the store clerk of this state.

System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

Hardware

Figure 18:
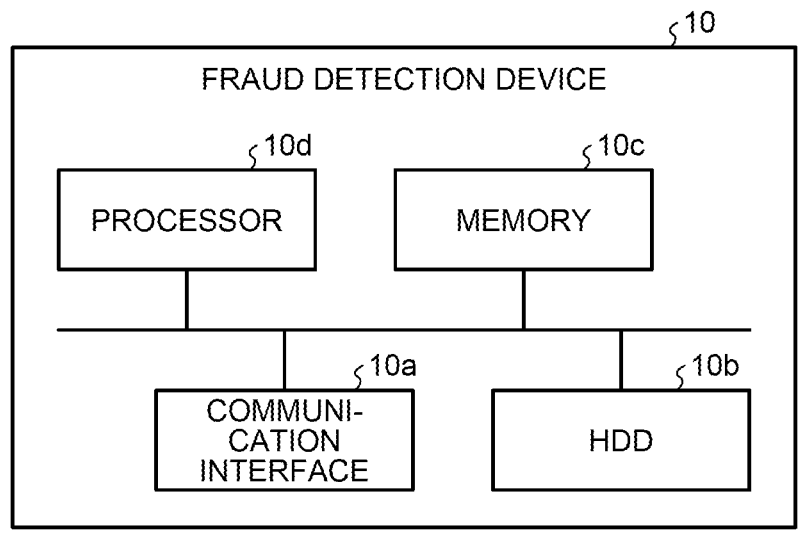
FIG. 18 is a diagram illustrating a hardware configuration example of the fraud detection device 10.

FIG. 18 is a diagram illustrating a hardware configuration example of the fraud detection device 10. As illustrated in FIG. 18, the fraud detection device 10 includes a communication interface 10a, a hard disk drive (HDD) 10b, a memory 10c, and a processor 10d. Furthermore, each of the units illustrated in FIG. 18 is connected each other via a bus or the like.

The communication interface 10a is a network interface card or the like, and communicates with another information processing apparatus. The HDD 10b stores therein the programs and data that operate the function illustrated in FIG. 5.

The processor 10d is a hardware circuit that operates the process that executes each of the functions described above in FIG. 5 or the like by reading the programs that execute the same process as that performed by each of the processing units illustrated in FIG. 5 from the HDD 10b or the like and loading the read programs in the memory 10c. In other words, the process executes the same function as that performed by each of the processing units included in the fraud detection device 10. Specifically, the processor 10d reads, from the HDD 10b or the like, the programs having the same function as that performed by the specifying unit 41, the generating unit 42, the evaluating unit 43, the notifying unit 44, and the like. Then, the processor 10d executes the process for executing the same processes as those performed by the specifying unit 41 and the like.

In this way, the fraud detection device 10 is operated as an information processing apparatus that executes a motion control process by reading and executing the programs that execute the same process as those performed by each of the processing units illustrated in FIG. 5. Furthermore, the fraud detection device 10 can also implement the same function as that described above in the embodiment by reading the programs from a recording medium by a medium recording device and executing the read programs. Furthermore, the programs described in another embodiment are not limited to be executed by the fraud detection device 10. For example, the present embodiment may also be similarly used in a case in which another computer or a server executes a program or in a case in which another computer and a server cooperatively execute the program with each other.

The programs that execute the same process as those performed by each of the processing units illustrated in FIG. 5 can be distributed via a network, such as the Internet. Furthermore, the programs can be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

Figure 19:
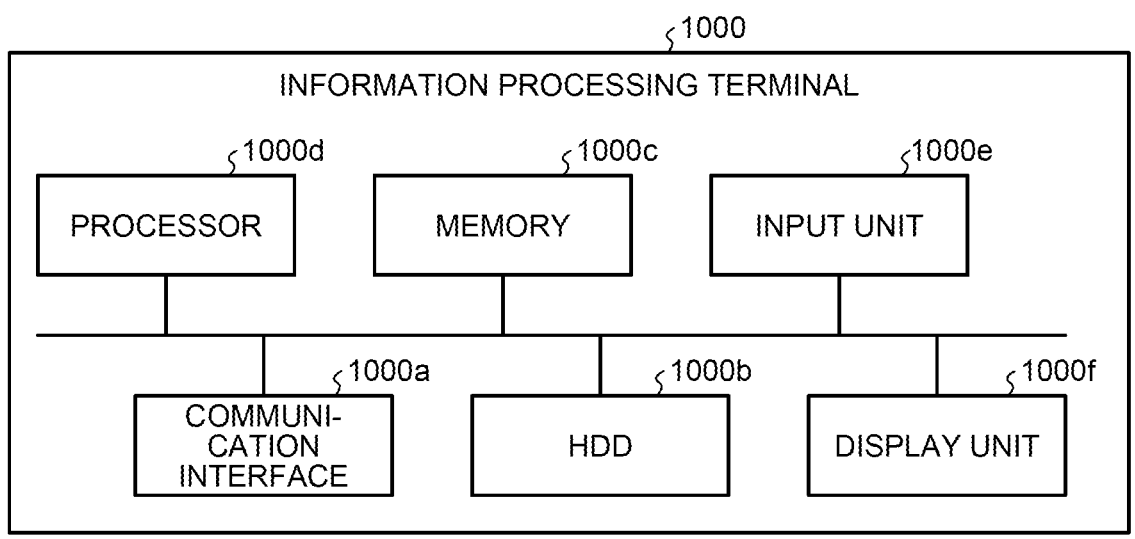
FIG. 19 is a diagram illustrating a hardware configuration example of an information processing terminal 1000.

FIG. 19 is a diagram illustrating a hardware configuration example of an information processing terminal 1000. The user terminal 100 and the store clerk terminal 300 may have the same configuration; therefore, in FIG. 19, the user terminal 100 and the store clerk terminal 300 are collectively illustrated, as the information processing terminal 1000, as the hardware configuration example of the user terminal 100 and the store clerk terminal 300. As illustrated in FIG. 19, the information processing terminal 1000 includes a communication interface 1000a, an HDD 1000b, a memory 1000c, a processor 1000d, an input unit 1000e, and a display unit 1000f. Furthermore, each of the units illustrated in FIG. 19 is connected with each other by a bus or the like.

The communication interface 1000a is a network interface card or the like and communicates with other information processing apparatus. The HDD 1000b stores therein the programs and data that operates each of the functions of the information processing terminal 1000.

The processor 1000d is a hardware circuit that operates the process that executes each of the function of the information processing terminal 1000 by reading, from the HDD 1000b or the like, the programs that execute a process of each of the functions of the information processing terminal 1000 and loading the programs into the memory 1000c. In other words, the process executes the same function as that performed by each of the processing units included in the information processing terminal 1000.

In this way, by reading and executing the programs for executing each of the functions of the information processing terminal 1000, the information processing terminal 1000 is operated as an information processing apparatus that performs a motion control process. Furthermore, the information processing terminal 1000 can also implement each of the functions of the information processing terminal 1000 by reading the programs from a recording medium by a medium reading device and executing the read programs. Furthermore, the programs described in another embodiment are not limited to be executed by the information processing terminal 1000. For example, the present embodiment may also be similarly used in a case in which another computer or a server execute a program, or cooperatively execute a program with each other.

Furthermore, the programs that execute the process of each of the functions of the information processing terminal 1000 can be distributed via a network, such as the Internet. Furthermore, these programs can be executed by recording the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input unit 1000e detects various input operations performed by a user, such as an input operation performed with respect to the programs executed by the processor 100d. Examples of the input operation include a touch operation or an operation of inserting an earphone terminal into the information processing terminal 1000. The touch operation mentioned here indicates various motions of touching the display unit 1000f, such as a tap, a double tap, a swipe, or a pinch. Furthermore, the touch operation includes, for example, a motion of an object, such as a finger, approaching the display unit 1000f. The input unit 1000e may be, for example, a button, a touch panel, a proximity sensor, or the like.

The display unit 1000f displays various kinds of visual information based on the control performed by the processor 1000d. The display unit 1000f may be a liquid crystal display (LCD), an organic light emitting diode (OLED), such as an organic electro luminescence (EL) display.

Figure 20:
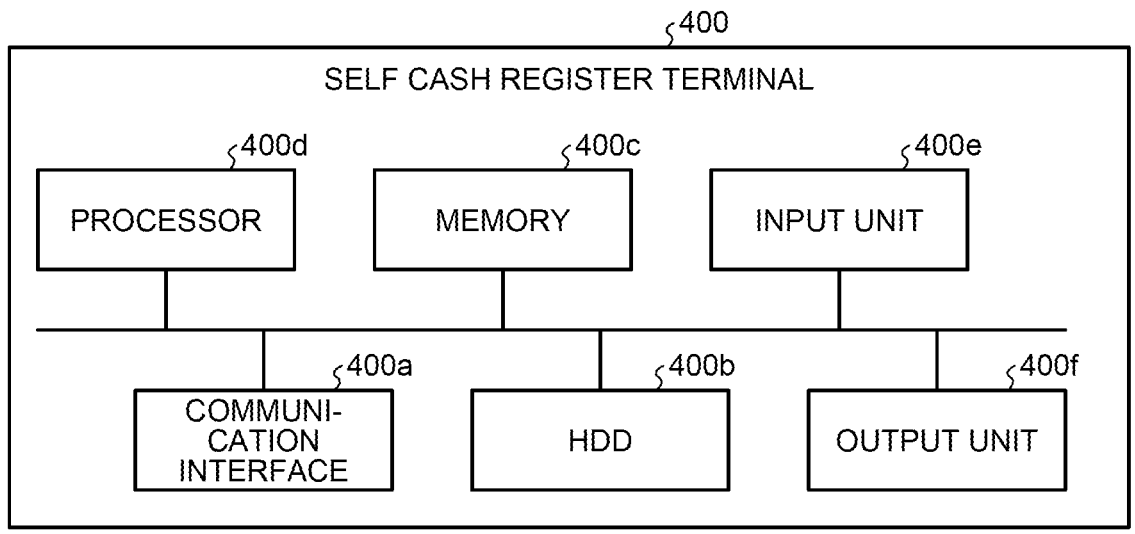
FIG. 20 is a diagram illustrating a hardware configuration example of a self cash register terminal 400.

FIG. 20 is a diagram illustrating a hardware configuration example of the self cash register terminal 400. As illustrated in FIG. 20, the self cash register terminal 400 includes a communication interface 400a, an HDD 400b, a memory 400c, a processor 400d, an input unit 400e, and an output unit 400f. Furthermore, each of the units illustrated in FIG. 20 is connected by a bus with each other.

The communication interface 400a is a network interface card or the like and communicates with another information processing apparatus. The HDD 400b stores therein programs and data that operate each of the functions of the self cash register terminal 400.

The processor 400d is a hardware circuit that operates the process that executes each of the functions of the self cash register terminal 400 by reading a program for executing a process of each of the functions of the self cash register terminal 400 from the HDD 400b or the like and loading the program into the memory 400c. In other words, the process executes the same function as that performed by each of the processing units included in the self cash register terminal 400.

In this way, by reading and executing the program for executing each of the functions of the self cash register terminal 400, the self cash register terminal 400 is operated as an information processing apparatus that performs a motion control process. Furthermore, the self cash register terminal 400 is also able to implement each of the functions of the self cash register terminal 400 by reading the programs from a recording medium by a medium reading device and executing the read programs. Furthermore, the programs described in another embodiment are not limited to be executed by the self cash register terminal 400. For example, the present embodiment may also be similarly used in a case in which another computer or a server execute a program, or cooperatively execute a program with each other.

Furthermore, the programs that execute the process of each of the functions of the self cash register terminal 400 can be distributed via a network, such as the Internet. Furthermore, these programs can be executed by recording the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input unit 400e detects various input operations performed by a user, such as an input operation performed by the processor 400d. An Example of the input operation includes a touch operation. In the case of the touch operation, the self cash register terminal 400 further includes a display unit, and the input operation detected by the input unit 400e may be a touch operation performed on the display unit. The input unit 400e may be, for example, a button, a touch panel, a proximity sensor, or the like.

The output unit 400f outputs data that is output from the program executed by the processor 400d via an external device connected to the self cash register terminal 400, such as an external display device. Furthermore, in the case where the self cash register terminal 400 includes a display unit, the self cash register terminal 400 need not include the output unit 400f.

Figure 21:
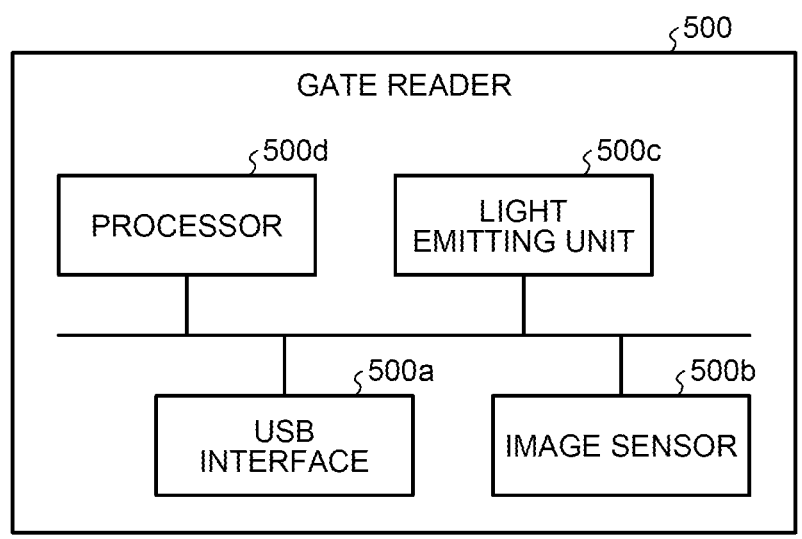
FIG. 21 is a diagram illustrating a hardware configuration example of a gate reader 500.

FIG. 21 is a diagram illustrating a hardware configuration example of the gate reader 500. As illustrated in FIG. 21, the gate reader 500 includes an USB interface 500a, an image sensor 500b, a light emitting unit 500c, and a processor 500d. Furthermore, each of the units illustrated in FIG. 21 is connected with each other by a bus or the like.

The USB interface 500a communicates with another information processing apparatus.

The image sensor 500b receives light that is emitted or reflected from a target object that is read by the gate reader 500, and converts brightness and darkness of light to electric information.

The light emitting unit 500c an illuminating light source, such as a high-brightness LED, and irradiates light in order to easily read a target object that is read by the gate reader 500. Furthermore, in the case where the target object that is read by the gate reader 500, a device that displays the target object, or the like emits light, the gate reader 500 need not include the light emitting unit 500c.

The processor 500d controls the light emitting unit 500c, irradiates the target object with light, controls the image sensor 500b, converts the target object to electric information, and reads the converted information. Furthermore, the processor 500d transmits the electric information on the read target object to another information processing apparatus via the USB interface 500a.

According to an aspect of an embodiment, in the system in which a customer performs a commodity product scan by himself or herself, it is possible to decide a priority level that is to be responded and that is associated with a fraudulent behavior for each commodity product.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:
   generating, by inputting a captured image into a machine learning model trained to identify skeleton patterns in digital or video images, skeleton information on a person positioned in a store and included in the captured image;
   detecting, by using the skeleton information, a motion of the person related to an object included in the captured image;
   specifying, by using positional information on the person included in the captured image, a first area indicating positional information inside the store in which the person is located at a time of detection of the motion from among a plurality of areas inside the store;
   specifying, by reading setting information recorded in a memory, first setting information that is associated with the first area, the first setting information including a type or a size of a commodity product, a character string indicating a price, or a numerical value associated with the first area;
   identifying, based on the first setting information, a priority level of a notification of an alert related to the motion of the person related to the object by determining at least one of the type or size of the commodity product, the price, and the numerical value associated with the first area as satisfying a threshold condition; and
   controlling notification of the alert to a terminal using the priority level.

2. The non-transitory computer-readable recording medium according to claim 1, wherein the detecting includes detecting, as the motion,
   a first motion of the person taking out the object from a shelf in which the object is accommodated,
   a second motion of the person putting the object taken out from the shelf into a basket,
   a third motion of the person registering the object taken out from the shelf to another terminal, or combination thereof.

3. The non-transitory computer-readable recording medium according to claim 1, wherein the process further comprises evaluating a behavior of the person exhibited with respect to the object based on a parameter for evaluating the behavior of the person exhibited with respect to the object.

4. The non-transitory computer-readable recording medium according to claim 2, wherein the process further comprises changing a parameter for evaluating a behavior of the person exhibited with respect to the object based on the first setting information.

5. The non-transitory computer-readable recording medium according to claim 4, wherein the changing includes changing, as the parameter, a first parameter with respect to a speed of the first motion.

6. The non-transitory computer-readable recording medium according to claim 4, wherein the changing includes changing, as the parameter, a second parameter with respect to a speed of the second motion.

7. The non-transitory computer-readable recording medium according to claim 4, wherein the changing includes changing, as the parameter, a third parameter with respect to a difference in detection time between the second motion and the third motion.

8. The non-transitory computer-readable recording medium according to claim 1, wherein the deciding includes changing the priority level based on an age, a gender, or combination thereof of the person.

9. The non-transitory computer-readable recording medium according to claim 3, wherein the process further comprises:

deciding whether or not the alert is to be notified based on the priority level, when it is evaluated, at the evaluating, that the person behaves fraudulently; and notifying the terminal of the alert when it is decided that the alert is notified.

10. An information processing method comprising:

generating, by inputting a captured image into a machine learning model, skeleton information on a person positioned in a store and included in the captured image, using a processor;

detecting, by using the skeleton information, a motion of the person related to an object included in the captured image, using the processor;

specifying, by using positional information on the person included in the captured image, a first area indicating positional information inside the store in which the person is located at a time of detection of the motion from among a plurality of areas inside the store, using the processor;

specifying, by reading setting information recorded in a memory, first setting information that is associated with the first area, the first setting information including a type or a size of a commodity, a character string indicating a price, or a numerical value associated with the first area, using the processor;

identifying, based on the first setting information, a priority level of a notification of an alert related to the motion of the person related to the object by determining at least one of the type or size of the commodity product, the price, and the numerical value associated with the first area as satisfying a threshold condition, using the processor; and controlling notification of the alert to a terminal using the priority level, using the processor.

11. An information processing apparatus comprising:

a memory: and a processor coupled to the memory, wherein the processor is configured to:

generate, by inputting a captured image into a machine learning model, skeleton information on a person positioned in a store and included in the captured image;

detect, by using the skeleton information, a motion of the person related to an object included in the captured image;

specify, by using positional information on the person included in the captured image, a first area indicating positional information inside the store in which the person is located at a time of detection of the motion from among a plurality of areas inside the store;

specify, by reading setting information recorded in a memory, first setting information that is associated with the first area, the first setting information including a type or a size of a commodity, a character string indicating a price, or a numerical value associated with the first area;

identify, based on the first setting information, a priority level of a notification of an alert related to the motion of the person related to the object by determining at least one of the type or size of the commodity product, the price, and the numerical value associated with the first area as satisfying a threshold condition; and control notification of the alert to a terminal using the priority level.

12. The information processing apparatus according to claim 11, wherein the process of detecting includes detecting, as the motion, a first motion of the person taking out the object from a shelf in which the object is accommodated, a second motion of the person putting the object taken out from the shelf into a basket, a third motion of the person registering the object taken out from the shelf to another terminal, or combination thereof.

13. The information processing apparatus according to claim 11, wherein the processor is further configured to evaluate a behavior of the person exhibited with respect to the object based on a parameter for evaluating the behavior of the person exhibited with respect to the object.

14. The information processing apparatus according to claim 12, wherein the processor is further configured to change a parameter for evaluating a behavior of the person exhibited with respect to the object based on the first setting information.

15. The information processing apparatus according to claim 14, wherein the process of changing includes changing, as the parameter, a first parameter with respect to a speed of the first motion.

16. The information processing apparatus according to claim 14, wherein the process of changing includes changing, as the parameter, a second parameter with respect to a speed of the second motion.

17. The information processing apparatus according to claim 14, wherein the process of changing includes changing, as the parameter, a third parameter with respect to a difference in detection time between the second motion and the third motion.

18. The information processing apparatus according to claim 11, wherein the process of deciding includes changing the priority level based on an age, a gender, or combination thereof of the person.

19. The information processing apparatus according to claim 13, wherein the processor is further configured to:

decide whether or not the alert is to be notified based on the priority level, when it is evaluated, at the process of evaluating the behavior, that the person behaves fraudulently; and notify the terminal of the alert when it is decided that the alert is notified.

* * * * *